US011387615B2

(12) United States Patent
Hijmans et al.

(10) Patent No.: US 11,387,615 B2
(45) Date of Patent: Jul. 12, 2022

(54) HELICAL CABLE ASSEMBLY TOOLING AND METHOD

(71) Applicant: Aerostar International, Inc., Sioux Falls, SD (US)

(72) Inventors: Carey Hijmans, Morgan Hilll, CA (US); David Solum, Sunnyvale, CA (US); Tom Cohen, Oakland, CA (US)

(73) Assignee: Aerostar International, Inc., Sioux Falls, SD (US)

( * ) Notice: Subject to any disclaimer, the term of this patent is extended or adjusted under 35 U.S.C. 154(b) by 271 days.

(21) Appl. No.: 16/840,896

(22) Filed: Apr. 6, 2020

(65) Prior Publication Data
US 2021/0313753 A1 Oct. 7, 2021

(51) Int. Cl.
*H01R 3/00* (2006.01)
*H01R 35/02* (2006.01)
(Continued)

(52) U.S. Cl.
CPC ........... *H01R 35/025* (2013.01); *G02B 6/449* (2013.01); *H01B 7/0045* (2013.01);
(Continued)

(58) Field of Classification Search
CPC ...... H01R 35/02; H01R 35/025; G02B 6/449; H01B 7/0045; H01B 7/1805; H02G 11/006; B64B 1/42; F16M 13/022
(Continued)

(56) References Cited

U.S. PATENT DOCUMENTS 4,542,858 A 9/1985 Manges
5,839,476 A 11/1998 Blase
(Continued)

FOREIGN PATENT DOCUMENTS

KR 2008-0098329 A 11/2008
KR 10-1436595 B1 9/2014

OTHER PUBLICATIONS

Igus TwisterBand: compact, modular and cost-effective, 2011, pp. 8.133-8.142.
(Continued)

*Primary Examiner* — Khiem M Nguyen
(74) *Attorney, Agent, or Firm* — Schwegman Lundberg & Woessner, P.A.

(57) ABSTRACT

Aspects of the technology relate to rotational electromechanical systems, in which data and or power are supplied to components while one part of the system is rotating relative to another part of the system. Repeated rotation may create strain on or otherwise cause the cables to intermittently or permanently fail. A helical cable management system is provided that enables full rotation to the extent permitted. One or more cables are wound in a helical shape around the axis of rotation, which distributes the deformation of the cable along the helical length. Rotation in one direction causes the helix diameter to increase, while rotation in the other direction causes the helix diameter to decrease. A structure is used to maintain the distance between helical turns, while permitting the increase and decrease of the helix diameter. This reduces the overall strain on the cables, which can significantly extend their useful lifetime.

20 Claims, 29 Drawing Sheets

(51) Int. Cl.
*G02B 6/44* (2006.01)
*H01B 7/18* (2006.01)
*H02G 11/00* (2006.01)
*H01B 7/00* (2006.01)
*F16M 13/02* (2006.01)
*B64B 1/42* (2006.01)

(52) U.S. Cl.
CPC ......... *H01B 7/1805* (2013.01); *H02G 11/006* (2013.01); *B64B 1/42* (2013.01); *F16M 13/022* (2013.01)

(58) Field of Classification Search
USPC .................................................. 439/162–164
See application file for complete search history.

(56) References Cited

U.S. PATENT DOCUMENTS

| | | |
|---|---|---|
| 6,722,602 B2 | 4/2004 | Mims |
| 7,726,823 B2 | 6/2010 | Rus et al. |
| 7,883,319 B2 | 2/2011 | Volkmer |
| 9,022,339 B2 | 5/2015 | Borg et al. |
| 9,399,299 B2 | 7/2016 | Hermey et al. |
| 10,276,997 B1 | 4/2019 | Holt |
| 10,294,084 B2 | 5/2019 | Hermey et al. |
| 10,302,889 B2 | 5/2019 | Chin et al. |
| 2008/0053685 A1 | 3/2008 | Chen et al. |
| 2014/0054412 A1 | 2/2014 | Guetta et al. |
| 2014/0353424 A1 | 12/2014 | Ratner |
| 2018/0241189 A1 | 8/2018 | Alger |
| 2019/0215429 A1 | 7/2019 | Appel et al. |
| 2021/0309339 A1* | 10/2021 | Hijmans .................. B64F 3/02 |

OTHER PUBLICATIONS

Liftband, igus, Special solutions—Movements in all directions LiftBand, Overview—Advantages, pp. 1-2, retrieved Jan. 17, 2020.
Twisterband HD for rotary motion in Very small spaces, https://www.igus.com/info/energy-chains-twisterband-hd-com [Jan. 17, 2020 1:37:07 PM], pp. 1-4.
Twisterchain—circular and spiral movements, snap-open along both sides, twisterchain®: e-chain® Cable Carrier for Small Spaces | igus®, Jan. 17, 2020, pp. 1-3.
"International Application Serial No. PCT/US2021/023260, International Search Report dated Jul. 16, 2021", 3 pgs.
"International Application Serial No. PCT/US2021/023260, Written Opinion dated Jul. 16, 2021", 4 pgs.

* cited by examiner

400

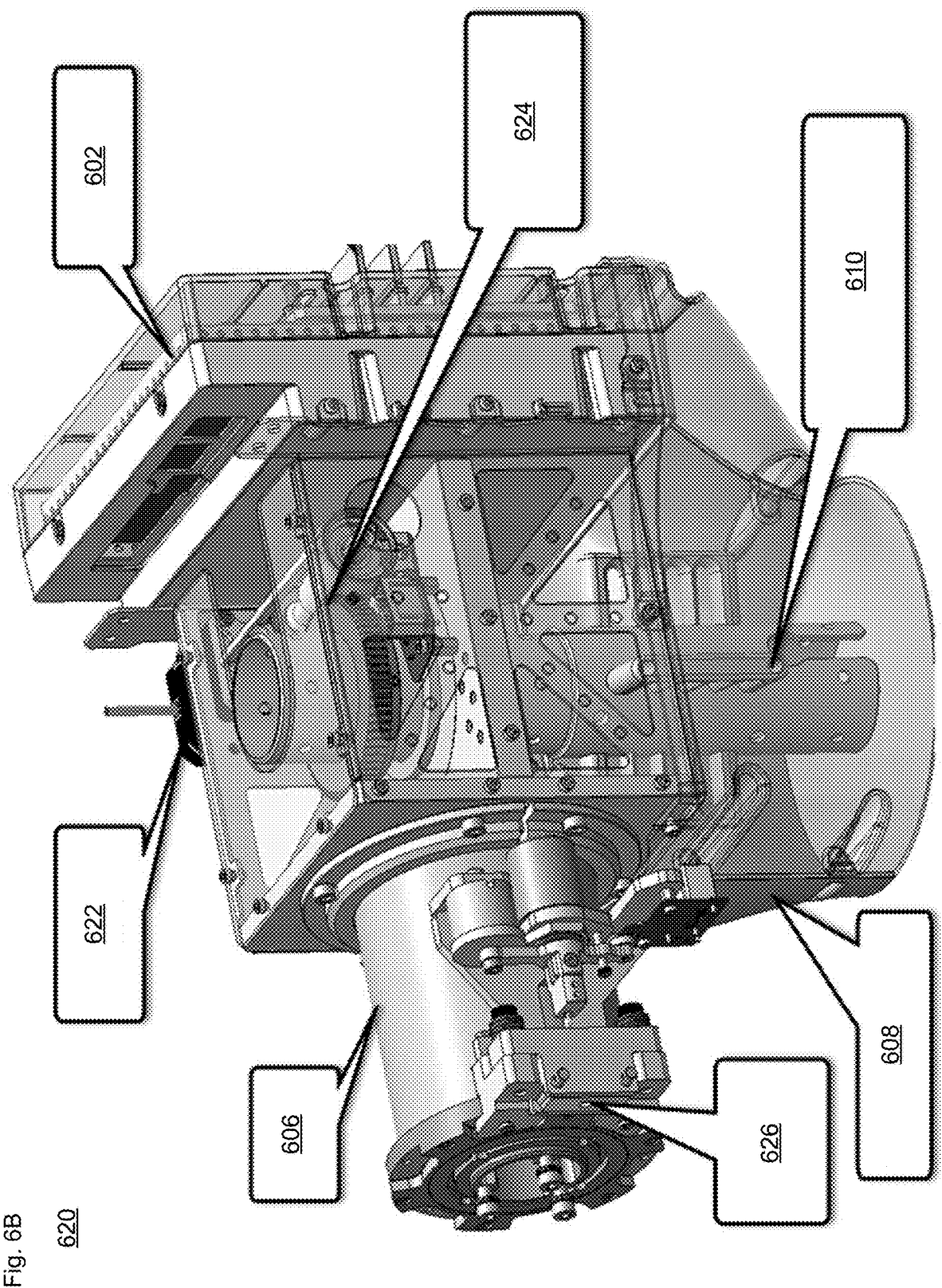

910

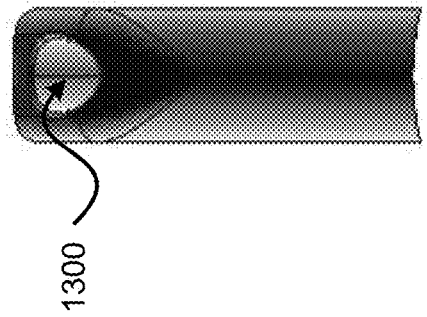
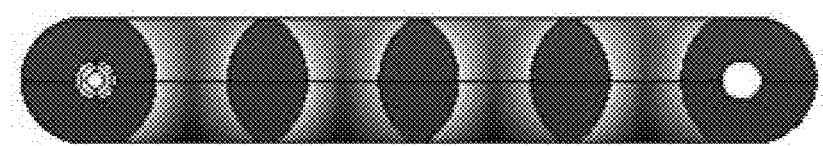
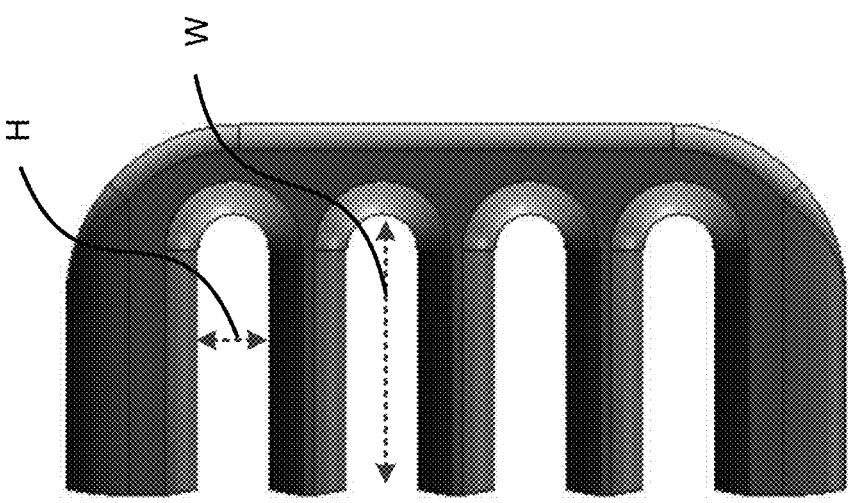

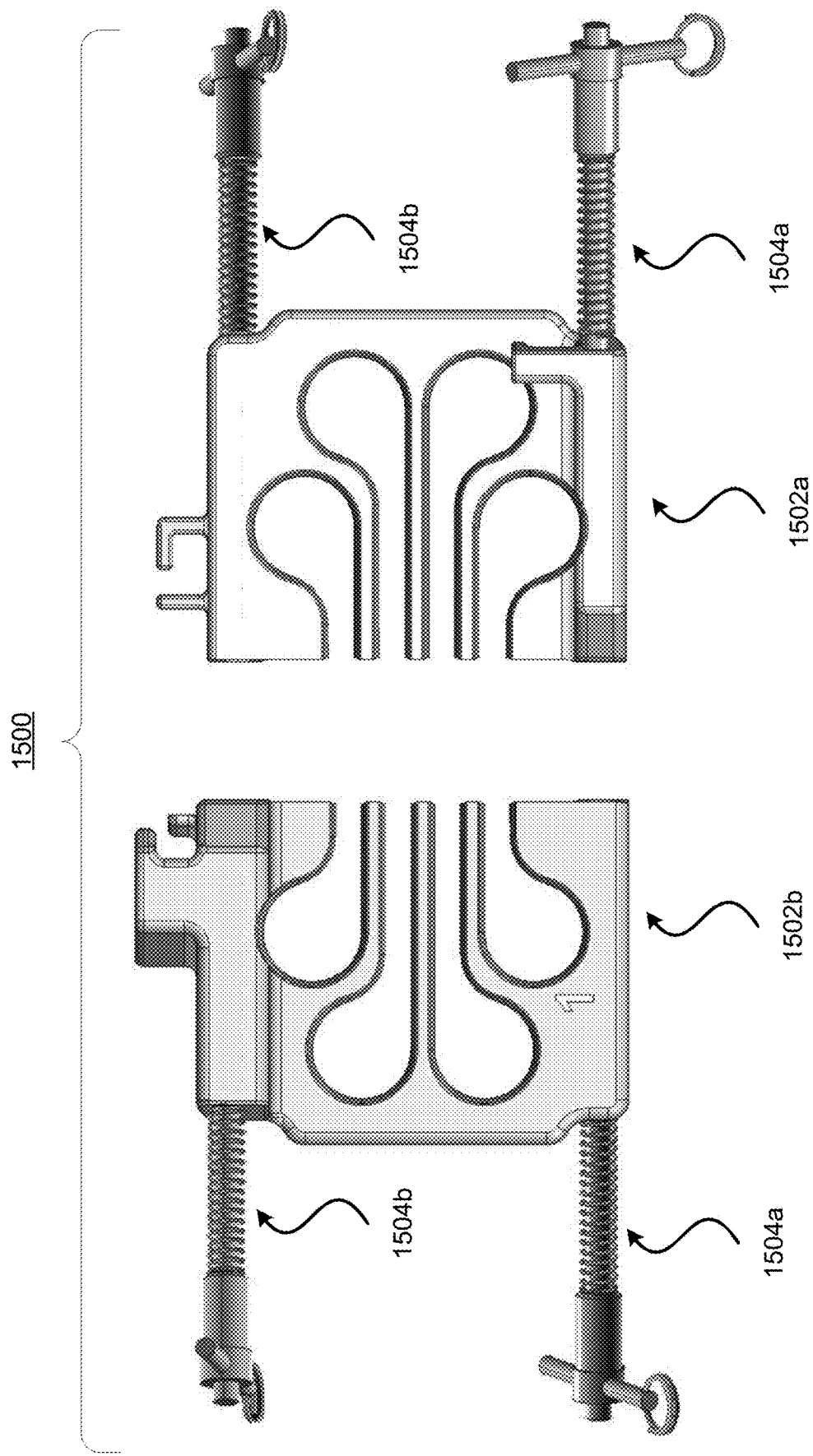

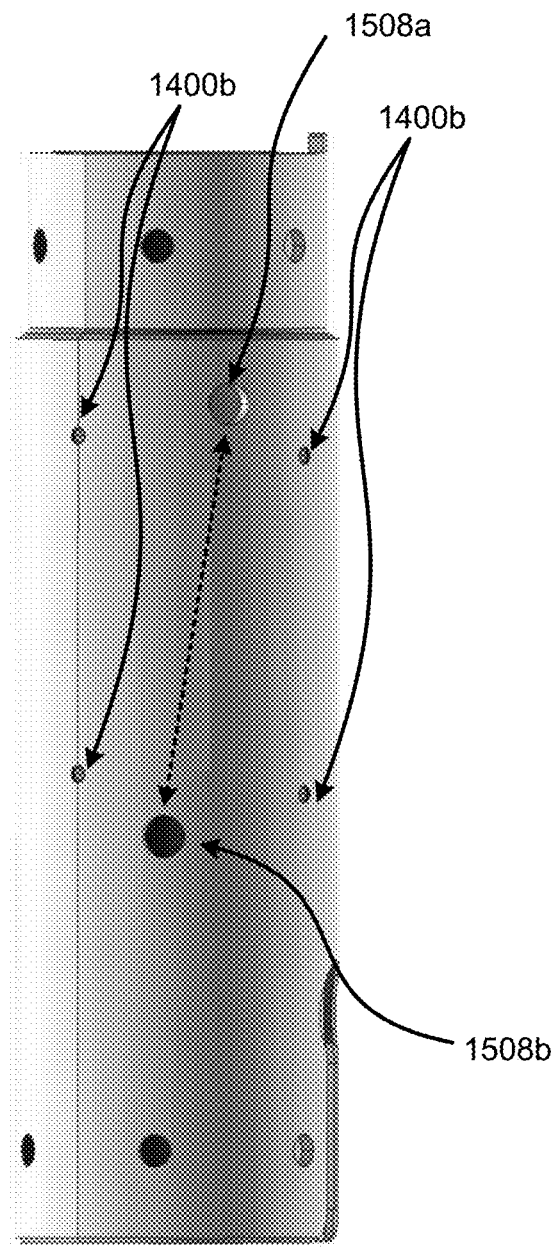

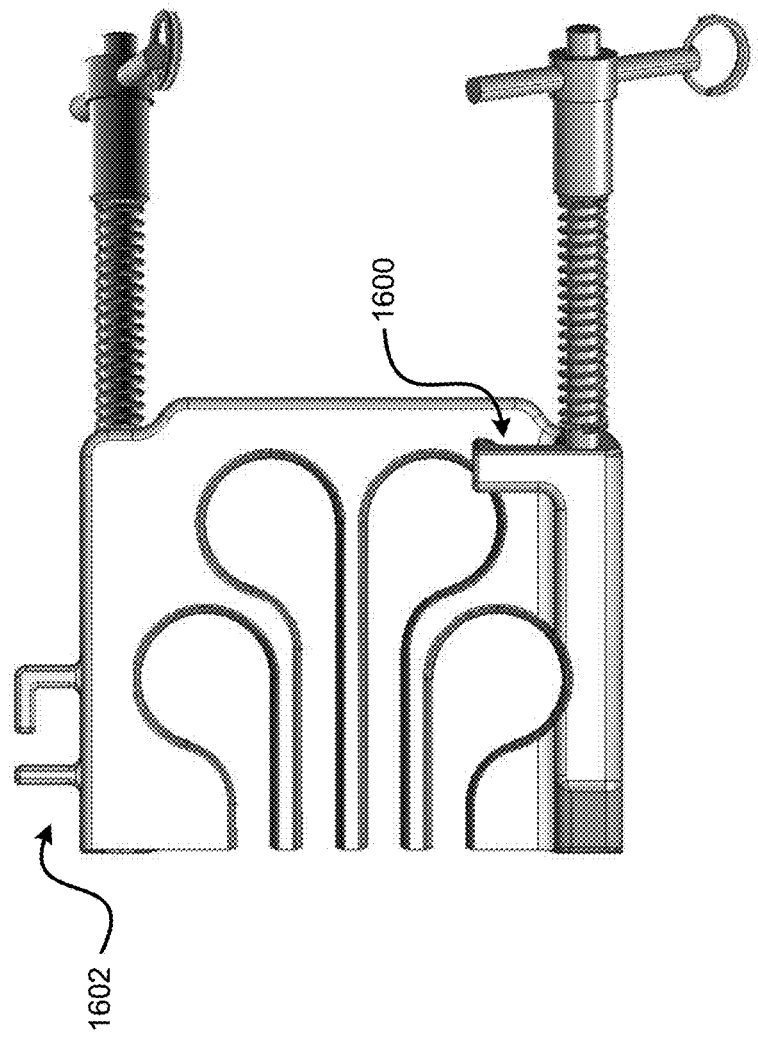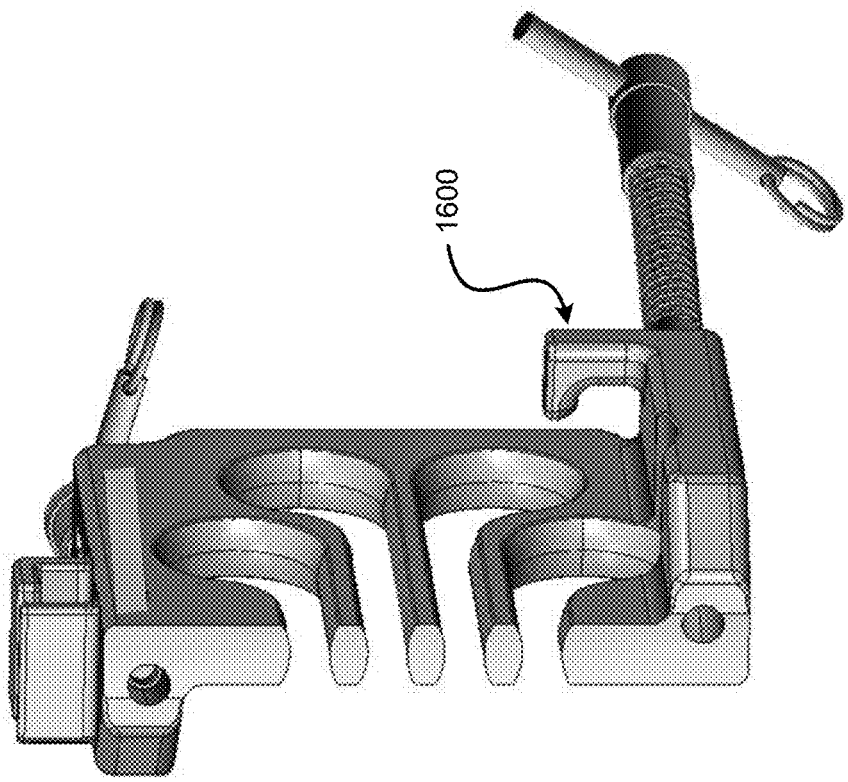

HELICAL CABLE ASSEMBLY TOOLING AND METHOD

CROSS-REFERENCE TO RELATED APPLICATIONS

This application is related to application Ser. No. 16/840,748, entitled "Helical Cable Management System", filed concurrently herewith, the disclosure of which is incorporated herein by reference.

BACKGROUND

Telecommunications connectivity via the Internet, cellular data networks and other systems is available in many parts of the world. However, there are locations where such connectivity is unavailable, unreliable or subject to outages from natural disasters. Some systems may provide network access to remote locations or to locations with limited networking infrastructure via satellites or high altitude platforms. In the latter case, due to environmental conditions and other limitations, it is challenging to keep the platforms aloft and operational over a desired service area for long durations, such as weeks, months or more.

SUMMARY

Aspects of the technology relate to a high altitude platform that is able to remain on station or move in a particular direction toward a desired location, for instance to provide telecommunication services. The high altitude platform may be a lighter-than-air platform such as a balloon configured to operate in the stratosphere. For instance, the balloon may include an envelope filled with lift gas and a payload for providing telecommunication services, with a connection member coupling the payload with the envelope. A lateral propulsion system may provide directional thrust for moving the balloon toward a destination or remaining on station. This can include a pointing mechanism that aligns a propeller assembly of the lateral propulsion system along a certain heading. By way of example, the propeller assembly may be able to rotate up to 360° or more around the connection member in order to adjust the balloon's heading.

Data communication and power may be supplied to the propeller assembly via one or more cables. However, repeated rotation of the propeller assembly about the connection member may create strain on or otherwise cause the cable(s) to fail, which could adversely impact operation of the lateral propulsion system and the useful lifespan of the high altitude platform. Thus, a helical cable management system is provided to reduce the likelihood of failure, and to enable reliable data communication with and power supply to the propeller assembly throughout the operational lifetime of the platform. This type of cable management approach may be employed in other systems that involve repeated rotational movement, such as manufacturing systems involving robots, automotive systems and aerospace technologies, among others.

According to one aspect, a tool for configuring a rotatable cable management system is provided. The tool includes first and second helix ear members. The first helix ear member is configured for removable attachment to a first area of an exterior surface of a coupling member. The first helix ear member has a plurality of slots disposed therealong, at least a portion of each slot being enlarged to receive a connectorized cable. The second helix ear member is configured for removable attachment to a second area of the exterior surface of the coupling member. The second helix ear member has a plurality of slots disposed therealong, at least a portion of each slot being enlarged to receive the connectorized cable. The tool also includes first and second set of fastener or retaining members. A first set of fastener or retaining members is received by the first helix ear member. The first set of fastener or retaining members is configured to removably attach the first helix ear member to the first area of the coupling member. The second set of fastener or retaining members is received by the second helix ear member. The second set of fastener or retaining members is configured to removably attach the second helix ear member to the second area of the coupling member. Upon affixation to the coupling member, the second helix ear member is arranged along the second area opposite to the first helix ear member arranged along the first area. The enlarged portions of the slots of the first and second helix ear members are configured to receive a connector end of the connectorized cable so that the connectorized cable can be wound in a helical arrangement around the exterior surface of the coupling member.

In one example, when the first and second helix ear members are attached to the exterior surface of the coupling member, the enlarged portions of the slots of the first helix ear member are remote from the exterior surface, and the enlarged portions of the slots of the second helix ear member are remote from the exterior surface.

In another example, at least some of the plurality of slots of the first helix ear member have different lengths, and at least some of the plurality of slots of the second helix ear member have different lengths. The plurality of slots of the first helix ear member may include at least 3 slots including a central slot and two other slots adjacent to the central slot, and the plurality of slots of the second helix ear member may include at least 3 slots including a central slot and two other slots adjacent to the central slot. Here, the central slot of the first helix ear member may be longer than the two other slots of the first helix ear member, and the central slot of the second helix ear member may be longer than the two other slots of the second helix ear member. The enlarged portions of the two other slots of the first helix ear member may extend away from one another, and the enlarged portions of the two other slots of the second helix ear member may extend away from one another.

In a further example, the first helix ear member may include at least one temporary restraining feature configured to temporarily secure the connectorized cable during or after winding in the helical arrangement. The second helix ear member may include a temporary restraining feature configured to temporarily secure the connectorized cable during or after winding in the helical arrangement.

In yet another example, the first helix ear member includes at least one temporary restraining feature configured to temporarily secure the connectorized cable during or after winding in the helical arrangement, and the second helix ear member includes a temporary restraining feature configured to temporarily secure the connectorized cable during or after winding in the helical arrangement. In this case, the at least one temporary restraining feature may include a first temporary restraining feature disposed along a first side of the first helix ear member and a second temporary restraining feature disposed along a second side of the first helix ear member, the second side being opposite the first side.

According to another aspect, a method of configuring a rotatable cable management system using a removable tool is provided. The method comprises removably securing a first helix ear member to a first area of an exterior surface of a coupling member, the first helix ear member having a plurality of slots disposed therealong, at least a portion of each slot being enlarged to receive a connectorized cable; removably securing a second helix ear member to a second area of the exterior surface of the coupling member, the second helix ear member having a plurality of slots disposed therealong, at least a portion of each slot being enlarged to receive the connectorized cable, wherein, upon affixation to the coupling member, the second helix ear member is arranged along the second area opposite to the first helix ear member arranged along the first area; inserting a connectorized end of the connectorized cable into the enlarged portion of a first slot of the plurality of slots of the first helix ear member; and sequentially passing the connectorized end of the connectorized cable through the enlarged portions of the plurality of slots of the first and second helix ear members to wind the connectorized cable in a helical arrangement around the exterior surface of the coupling member.

In one example, the method further comprises fixedly securing a cable management structure to the coupling member, the cable management structure maintaining the cable in the helical arrangement. Upon fixedly securing the cable management structure to the coupling member, the method also includes removing the first helix ear member from the first area of the of the exterior surface of the coupling member, and removing the second helix ear member from the second area of the of the exterior surface of the coupling member. In this case, the cable management structure may comprise a plurality of finger structures, and fixedly securing the cable management structure to the coupling member may include securing each of the plurality of finger structures in a disturbed arrangement around the exterior surface of the coupling member.

In another example, the method further comprises, prior to removably securing the first helix ear member to the coupling member, arranging the first helix ear member adjacent to the first area of the exterior surface of the coupling member in accordance with a marker of the coupling member; and prior to removably securing the second helix ear member to the coupling member, arranging the second helix ear member adjacent to the second area of the exterior surface of the coupling member in accordance with the marker.

In yet another example, the method also includes, after sequentially passing the connectorized end of the connectorized cable through the enlarged portions of one or more of the plurality of slots of the first and second helix ear members, disposing the connectorized end in a first temporary restraining feature of either the first helix ear member or the second helix ear member. Here, after sequentially passing the connectorized end of the connectorized cable through the enlarged portions of one or more of the plurality of slots of the first and second helix ear members, the method may also include disposing an opposing end of the connectorized cable in a second temporary restraining feature of either the first helix ear member or the second helix ear member.

In another example, the method further comprises inserting a connectorized end of a another connectorized cable into the enlarged portion of the first slot of the plurality of slots of the first helix ear member; and sequentially passing the connectorized end of the other connectorized cable through the enlarged portions of the plurality of slots of the first and second helix ear members to wind the other connectorized cable in a helical arrangement around the exterior surface of the coupling member, so that both the connectorized cable and the other connectorized cable are each wound in the helical arrangement.

In a further example, the method additionally comprises securing a bracket member to a third area of the exterior surface of a coupling member; and affixing the connectorized end of the connectorized cable to the bracket member.

The method may also include attaching the connectorized cable to a lateral propulsion system of a high altitude platform configured for operation in the stratosphere. Here, the method may also include attaching the coupling member to a connection member of the high altitude platform.

BRIEF DESCRIPTION OF THE DRAWINGS

FIGS. 6A-C illustrate a control assembly in accordance with aspects of the technology.

FIGS. 13A-D illustrate a retaining component in accordance with aspects of the technology.

FIGS. 15A-C illustrate a cable assembly tool in accordance with aspects of the technology.

FIGS. 16A-F illustrate a first tool mechanism in accordance with aspects of the technology.

DETAILED DESCRIPTION

Overview

Figure 1:
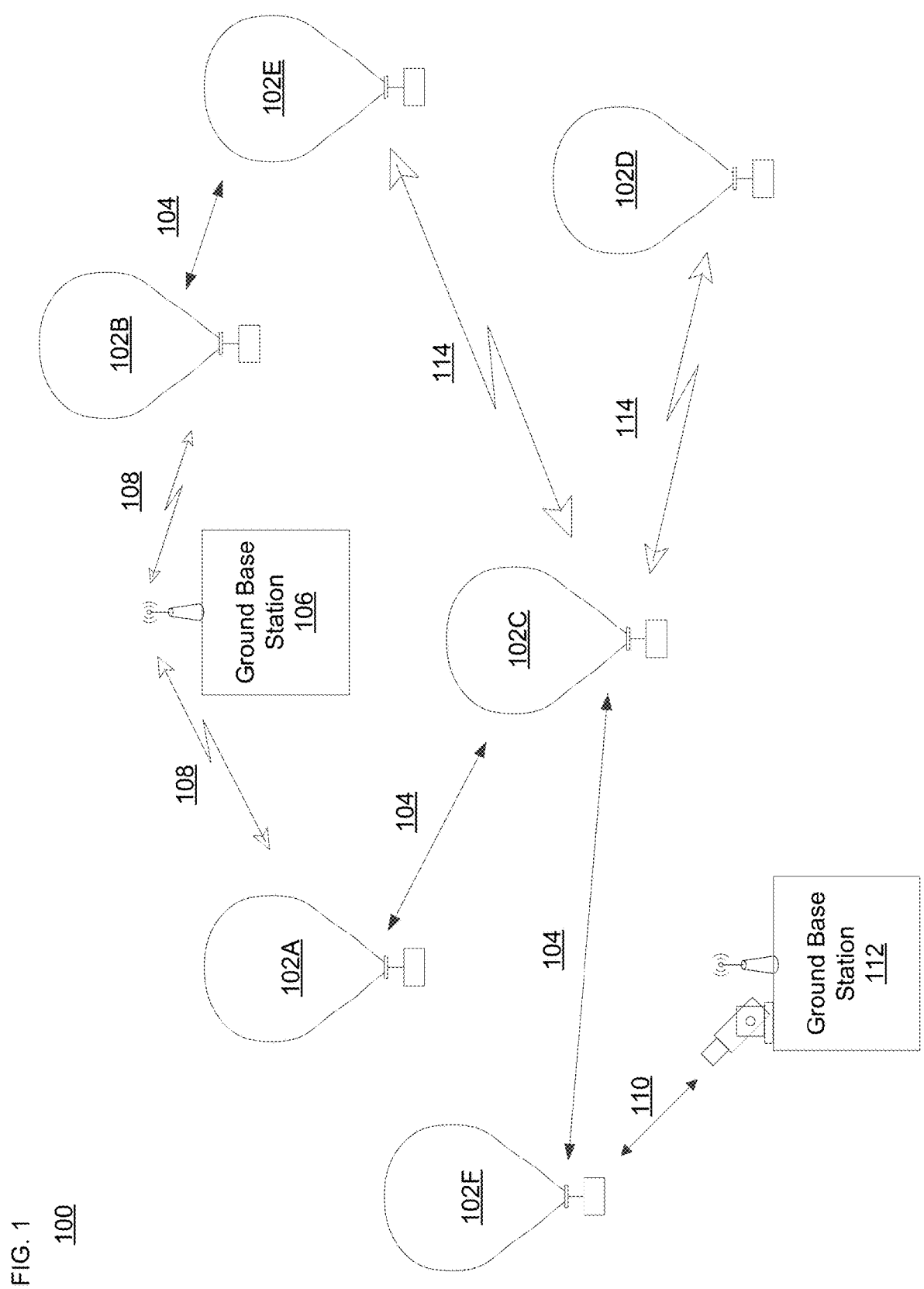
FIG. 1 is a functional diagram of an example system in accordance with aspects of the disclosure.

The technology relates to rotational electromechanical systems, such as lateral propulsion systems for high altitude platforms (HAPs) designed to operate, e.g., in the stratosphere. Stratospheric HAPs, such as high altitude balloons, may have a float altitude of between about 50,000-120,000 feet above sea level. The ambient temperature may be on the order of −10° C. to −90° C. or colder, depending on the altitude and weather conditions. These and other environmental factors in the stratosphere can be challenging for lateral propulsion systems. The cable management approach discussed herein is designed to effectively operate in such conditions, although it may also be used in terrestrial or other environments with different types of systems besides lateral propulsion systems.

As explained below, an example lateral propulsion system may employ a propeller arrangement to provide directional adjustments to the HAP, for instance to counteract movement due to the wind, or to otherwise cause the HAP to move along a selected heading. Such adjustments can enhance operation across a fleet of HAPs. For instance, by employing a small amount of lateral propulsion at particular times, a given platform may stay on station over a desired service area for a longer period, or change direction to move towards a particular destination. The platform may also be able to return to the desired service area more quickly using lateral propulsion to compensate against undesired wind effects. Applying this approach for some or all of the platforms in the fleet may mean that the total number of platforms required to provide a given level of service (e.g., telecommunications coverage for a service area) may be significantly reduced as compared to a fleet that does not employ lateral propulsion.

One or more motors can be used to actuate a lateral propulsion system of the HAP to effect the directional changes. This can include a pointing axis motor for rotating the lateral propulsion system to a particular heading, and a drive motor for causing a propeller assembly or other propulsion mechanism to turn on and off. In one example, a controller of the lateral propulsion system is configured to cause the pointing axis motor to rotate the propeller assembly about a connection member of the HAP by up to 360° or more. Fixed wires may be arranged for communicating between the motor and controller. The wiring between the controller and the motor(s), such as power and data cables, may be subject to repeated stresses due to such rotation.

For instance, each cable may be attached at one end to the controller and at the other end to a motor, where the motor and controller are rotating relative to one another as the lateral propulsion system rotates around a central axis of the connection member. This can cause twisting of the wire conductors within a given cable, crimping of the cable if a minimum bend radius is violated, metal fatigue due to repeated bending, etc. Such issues can be magnified during long term operation of the HAP, especially when floating at high altitudes in very low temperatures. A helical cable management assembly can be employed to mitigate these issues. As explained further below, the cables are wound in a helical shape around the axis of rotation, which distributes the deformation of the cable along the helical length. Rotation in one direction causes the helix diameter to increase, while rotation in the other direction causes the helix diameter to decrease. A structure is used to maintain the distance between helical turns, while permitting the increase and decrease of the helix diameter. This reduces the overall strain on the cables, which can significantly extend their useful lifetime.

Example Balloon Systems

FIG. 1 depicts an example system 100 in which a fleet of high altitude platforms, such as balloon HAPs, may be used. This example should not be considered as limiting the scope of the disclosure or usefulness of the features described herein. System 100 may be considered a balloon network. In this example, balloon network 100 includes a plurality of devices, such as balloons 102A-F as well as ground-base stations 106 and 112. Balloon network 100 may also include a plurality of additional devices, such as various computing devices (not shown) as discussed in more detail below or other systems that may participate in the network.

The devices in system 100 are configured to communicate with one another. As an example, the balloons may include communication links 104 and/or 114 in order to facilitate intra-balloon communications. By way of example, links 114 may employ radio frequency (RF) signals (e.g., millimeter wave transmissions) while links 104 employ free-space optical transmission. Alternatively, all links may be RF, optical, or a hybrid that employs both RF and optical transmission. In this way balloons 102A-F may collectively function as a mesh network for data communications. At least some of the balloons may be configured for communications with ground-based stations 106 and 112 via respective links 108 and 110, which may be RF and/or optical links.

In one scenario, a given balloon 102 may be configured to transmit an optical signal via an optical link 104. Here, the given balloon 102 may use one or more high-power light-emitting diodes (LEDs) to transmit an optical signal. Alternatively, some or all of the balloons 102 may include laser systems for free-space optical communications over the optical links 104. Other types of free-space communication are possible. Further, in order to receive an optical signal from another balloon via an optical link 104, the balloon may include one or more optical receivers.

The balloons may also utilize one or more of various RF air-interface protocols for communication with ground-based stations via respective communication links. For instance, some or all of balloons 102A-F may be configured to communicate with ground-based stations 106 and 112 via RF links 108 using various protocols described in IEEE 802.11 (including any of the IEEE 802.11 revisions), cellular protocols such as GSM, CDMA, UMTS, EV-DO, WiMAX, and/or LTE, 5G and/or one or more proprietary protocols developed for long distance communication, among other possibilities.

In some examples, the links may not provide a desired link capacity for balloon-to-ground communications. For instance, increased capacity may be desirable to provide backhaul links from a ground-based gateway. Accordingly, an example network may also include downlink balloons, which could provide a high-capacity air-ground link between the various balloons of the network and the ground-base stations. For example, in balloon network 100, balloon 102F may be configured as a downlink balloon that directly communicates with station 112.

Like other balloons in network 100, downlink balloon 102F may be operable for communication (e.g., RF or optical) with one or more other balloons via link(s) 104. Downlink balloon 102F may also be configured for free-space optical communication with ground-based station 112 via an optical link 110. Optical link 110 may therefore serve as a high-capacity link (as compared to an RF link 108) between the balloon network 100 and the ground-based station 112. Downlink balloon 102F may additionally be operable for RF communication with ground-based stations 106. In other cases, downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

A downlink balloon may be equipped with a specialized, high bandwidth RF communication system for balloon-to-ground communications, instead of, or in addition to, a free-space optical communication system. The high bandwidth RF communication system may take the form of an ultra-wideband system, which may provide an RF link with substantially the same capacity as one of the optical links 104.

In a further example, some or all of balloons 102A-F could be configured to establish a communication link with space-based satellites and/or other types of high altitude platforms (e.g., drones, airplanes, airships, etc.) in addition to, or as an alternative to, a ground based communication link. In some embodiments, a balloon may communicate with a satellite or a high altitude platform via an optical or RF link. However, other types of communication arrangements are possible.

As noted above, the balloons 102A-F may collectively function as a mesh network. More specifically, since balloons 102A-F may communicate with one another using free-space optical links, the balloons may collectively function as a free-space optical mesh network. In a mesh-network configuration, each balloon may function as a node of the mesh network, which is operable to receive data directed to it and to route data to other balloons. As such, data may be routed from a source balloon to a destination balloon by determining an appropriate sequence of links between the source balloon and the destination balloon.

The network topology may change as the balloons move relative to one another and/or relative to the ground. Accordingly, the balloon network 100 may apply a mesh protocol to update the state of the network as the topology of the network changes. For example, to address the mobility of the balloons 102A to 102F, the balloon network 100 may employ and/or adapt various techniques that are employed in mobile ad hoc networks (MANETs). Other examples are possible as well.

Balloon network 100 may also implement station-keeping functions using winds and altitude control and/or lateral propulsion to help provide a desired network topology. For example, station-keeping may involve some or all of balloons 102A-F maintaining and/or moving into a certain position relative to one or more other balloons in the network (and possibly in a certain position relative to a ground-based station or service area). As part of this process, each balloon may implement station-keeping functions to determine its desired positioning within the desired topology, and if necessary, to determine how to move to and/or maintain the desired position. Alternatively, the platforms may be moved without regard to the position of their neighbors, for instance to enhance or otherwise adjust communication coverage at a particular geographic location.

The desired topology may thus vary depending upon the particular implementation and whether or not the balloons are continuously moving. In some cases, balloons may implement station-keeping to provide a substantially uniform topology where the balloons function to position themselves at substantially the same distance (or within a certain range of distances) from adjacent balloons in the balloon network 100. Alternatively, the balloon network 100 may have a non-uniform topology where balloons are distributed more or less densely in certain areas, for various reasons. As an example, to help meet the higher bandwidth demands, balloons may be clustered more densely over areas with greater demand (such as urban areas) and less densely over areas with lesser demand (such as over large bodies of water). In addition, the topology of an example balloon network may be adaptable allowing balloons to adjust their respective positioning in accordance with a change in the desired topology of the network.

The balloons of FIG. 1 may be high-altitude balloons that are deployed in the stratosphere. As an example, in a high altitude balloon network, the balloons may generally be configured to operate at stratospheric altitudes, e.g., between 50,000 ft and 70,000 ft or more or less, in order to limit the balloons' exposure to high winds and interference with commercial airplane flights. In order for the balloons to provide a reliable mesh network in the stratosphere, where winds may affect the locations of the various balloons in an asymmetrical manner, the balloons may be configured to move latitudinally and/or longitudinally relative to one another by adjusting their respective altitudes, such that the wind carries the respective balloons to the respectively desired locations. Lateral propulsion may also be employed to affect the balloon's path of travel.

Figure 2:
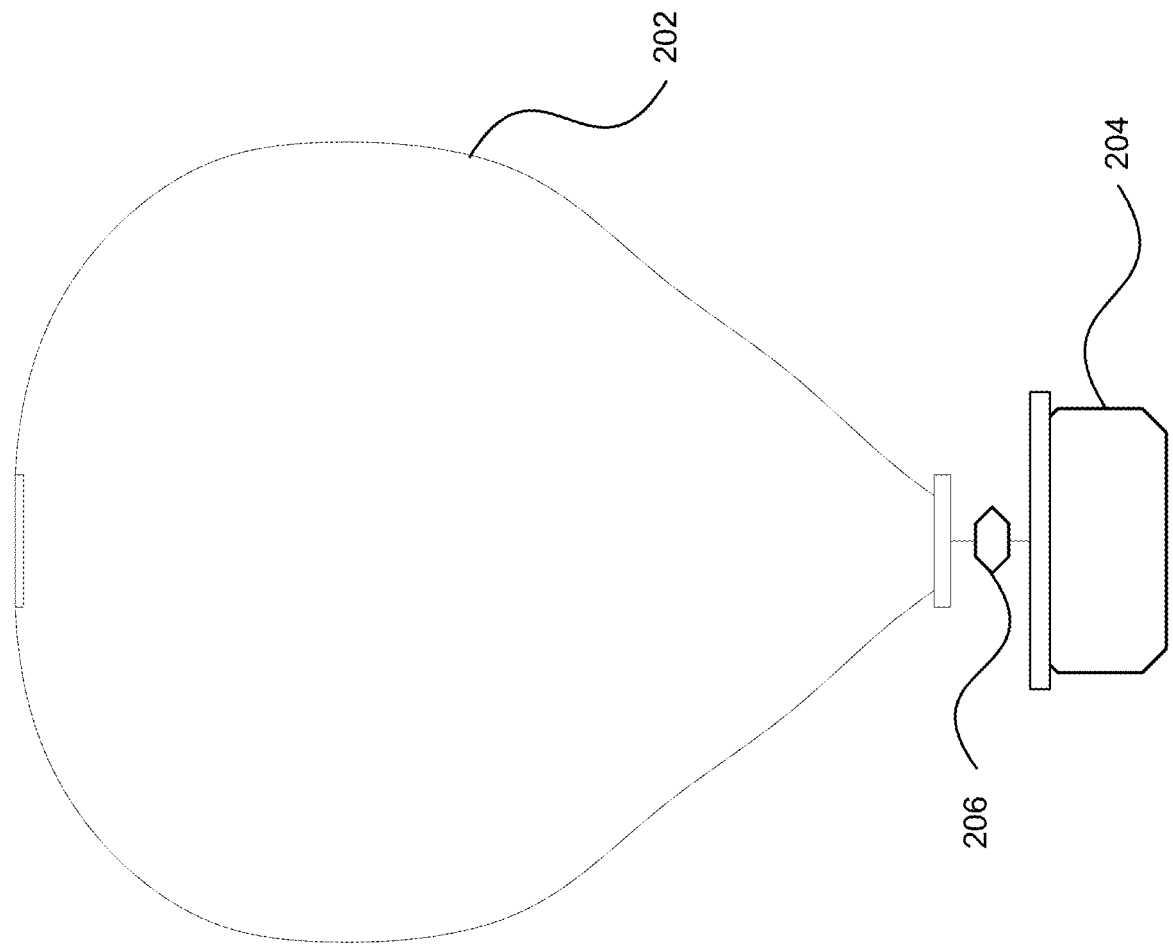
FIG. 2 illustrates a balloon configuration in accordance with aspects of the disclosure.

In an example configuration, the high altitude balloon platforms include an envelope and a payload, along with various other components. FIG. 2 is one example of a high-altitude balloon 200, which may represent any of the balloons of FIG. 1. As shown, the example balloon 200 includes an envelope 202, a payload 204 and a termination (e.g., cut-down & parachute) device 206.

The envelope 202 may take various shapes and forms. For instance, the envelope 202 may be made of materials such as polyethylene, mylar, FEP, rubber, latex or other thin film materials or composite laminates of those materials with fiber reinforcements imbedded inside or outside. Other materials or combinations thereof or laminations may also be employed to deliver required strength, gas barrier, RF and thermal properties. Furthermore, the shape and size of the envelope 202 may vary depending upon the particular implementation. Additionally, the envelope 202 may be filled with different types of gases, such as air, helium and/or hydrogen. Other types of gases, and combinations thereof, are possible as well. Shapes may include typical balloon shapes like spheres and "pumpkins", or aerodynamic shapes that are symmetric, provide shaped lift, or are changeable in shape. Lift may come from lift gasses (e.g., helium, hydrogen), electrostatic charging of conductive surfaces, aerodynamic lift (wing shapes), air moving devices (propellers, flapping wings, electrostatic propulsion, etc.) or any hybrid combination of lifting techniques.

Figure 3:
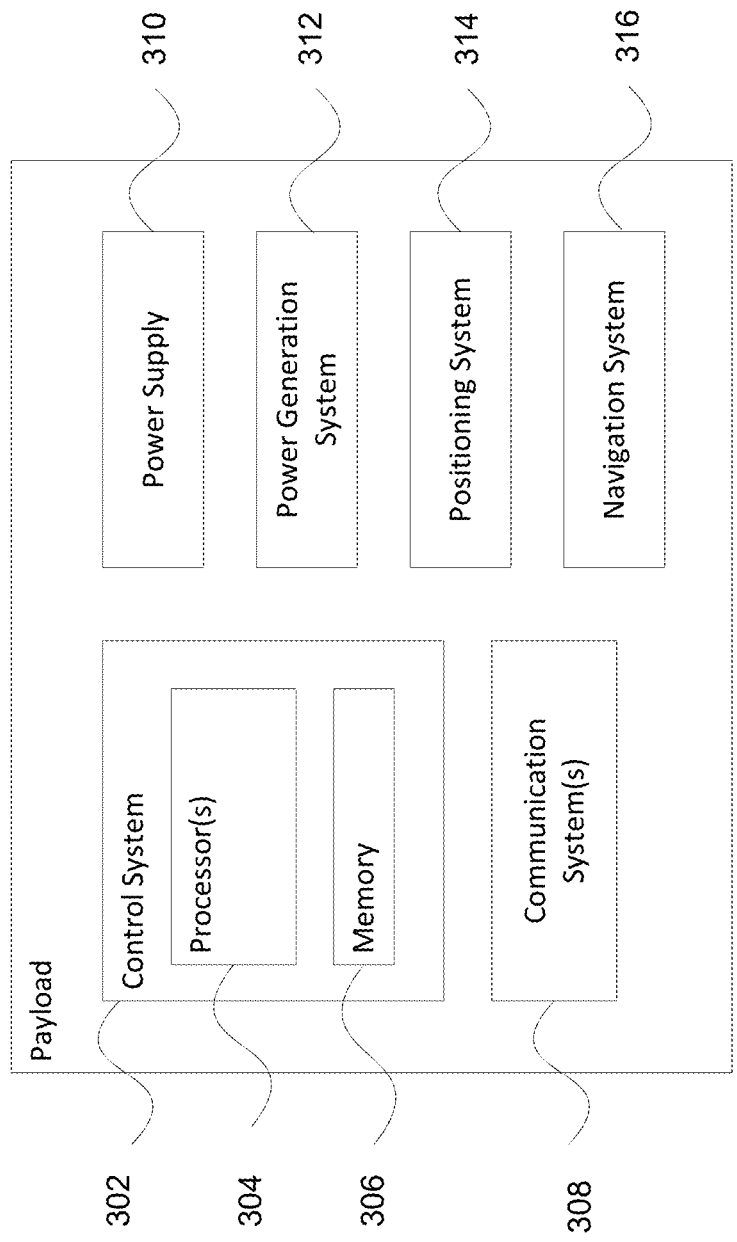
FIG. 3 is an example payload arrangement in accordance with aspects of the disclosure.

According to one example shown in FIG. 3, a payload 300 of a HAP platform includes a control system 302 having one or more processors 304 and on-board data storage in the form of memory 306. Memory 306 stores information accessible by the processor(s) 304, including instructions that can be executed by the processors. The memory 306 also includes data that can be retrieved, manipulated or stored by the processor. The memory can be of any non-transitory type capable of storing information accessible by the processor, such as a hard-drive, memory card, ROM, RAM, and other types of write-capable, and read-only memories. The instructions can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. The data can be retrieved, stored or modified by the one or more processors 304 in accordance with the instructions.

The one or more processors 304 can include any conventional processors, such as a commercially available CPU. Alternatively, each processor can be a dedicated component such as an ASIC, controller, or other hardware-based processor. Although FIG. 3 functionally illustrates the processor(s) 304, memory 306, and other elements of control system 302 as being within the same block, the system can actually comprise multiple processors, computers, computing devices, and/or memories that may or may not be stored within the same physical housing. For example, the memory can be a hard drive or other storage media located in a housing different from that of control system 302. Accordingly, references to a processor, computer, computing device, or memory will be understood to include references to a collection of processors, computers, computing devices, or memories that may or may not operate in parallel.

The payload 300 may also include various other types of equipment and systems to provide a number of different functions. For example, as shown the payload 300 includes one or more communication systems 308, which may transmit signals via RF and/or optical links as discussed above. The communication system(s) 308 include communication components such as one or more transmitters and receivers (or transceivers), one or more antennae, and a baseband processing subsystem. (not shown)

The payload 300 is illustrated as also including a power supply 310 to supply power to the various components of balloon. The power supply 310 could include one or more rechargeable batteries or other energy storage systems like capacitors or regenerative fuel cells. In addition, the balloon 300 may include a power generation system 312 in addition to or as part of the power supply. The power generation system 312 may include solar panels, stored energy (hot air), relative wind power generation, or differential atmospheric charging (not shown), or any combination thereof, and could be used to generate power that charges and/or is distributed by the power supply 310.

The payload 300 may additionally include a positioning system 314. The positioning system 314 could include, for example, a global positioning system (GPS), an inertial navigation system, and/or a star-tracking system. The positioning system 314 may additionally or alternatively include various motion sensors (e.g., accelerometers, magnetometers, gyroscopes, and/or compasses). The positioning system 314 may additionally or alternatively include one or more video and/or still cameras, and/or various sensors for capturing environmental data. Some or all of the components and systems within payload 300 may be implemented in a radiosonde or other probe, which may be operable to measure, e.g., pressure, altitude, geographical position (latitude and longitude), temperature, relative humidity, and/or wind speed and/or wind direction, among other information. Wind sensors may include different types of components like pitot tubes, hot wire or ultrasonic anemometers or similar, windmill or other aerodynamic pressure sensors, laser/lidar, or other methods of measuring relative velocities or distant winds.

Payload 300 may include a navigation system 316 separate from, or partially or fully incorporated into control system 302. The navigation system 316 may implement station-keeping functions to maintain position within and/or move to a position in accordance with a desired topology or other service requirement. In particular, the navigation system 316 may use wind data (e.g., from onboard and/or remote sensors) to determine altitudinal and/or lateral positional adjustments that result in the wind carrying the balloon in a desired direction and/or to a desired location. Lateral positional adjustments may also be handled directly by a lateral positioning system that is separate from the payload. Alternatively, the altitudinal and/or lateral adjustments may be computed by a central control location and transmitted by a ground based, air based, or satellite based system and communicated to the HAP. In other embodiments, specific HAPs may be configured to compute altitudinal and/or lateral adjustments for other HAPs and transmit the adjustment commands to those other HAPs.

Figure 4:
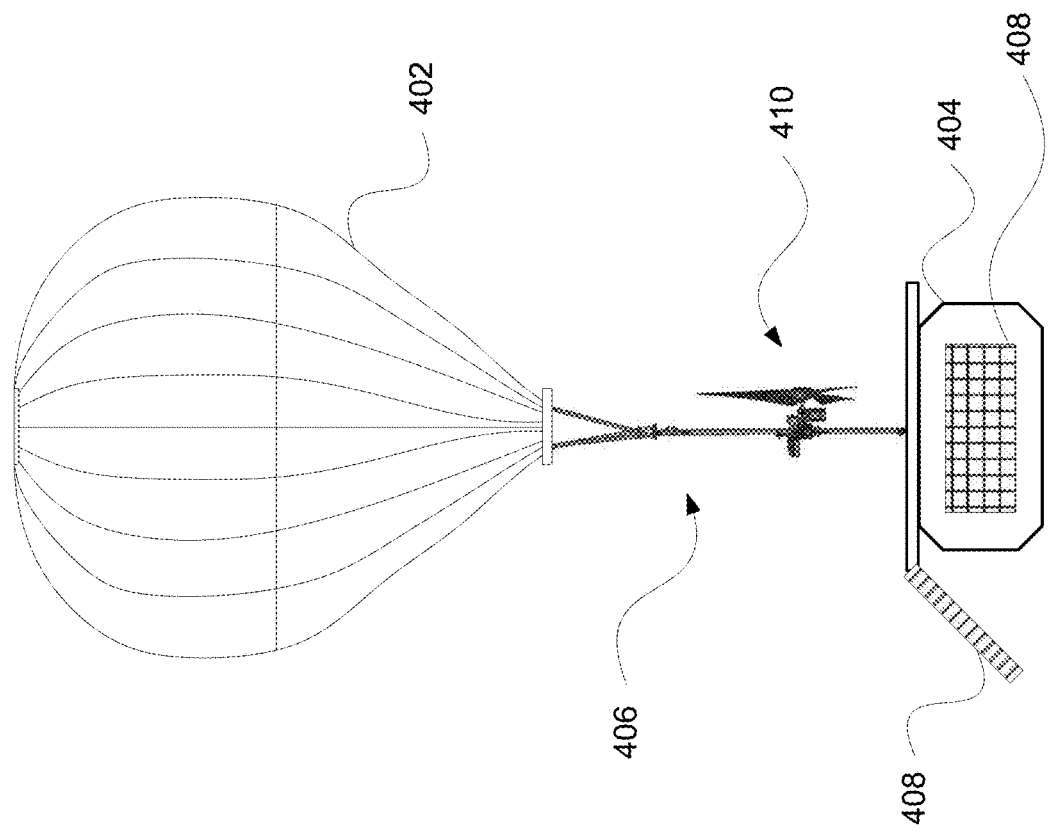
FIG. 4 is an example of a balloon platform with lateral propulsion in accordance with aspects of the disclosure.

In order to affect lateral positions or velocities, the platform includes a lateral propulsion system. FIG. 4 illustrates one example configuration 400 of a balloon-type HAP with propeller-based lateral propulsion, which may represent any of the balloons of FIG. 1. As shown, the example 400 includes an envelope 402, a payload 404 and a down connect member 406 configured to couple the envelope 402 and the payload 404 together. Cables or other wiring between the payload 404 and the envelope 402 may be run within or along the down connect member 406. One or more solar panel assemblies 408 may be coupled to the payload 404 or another part of the balloon platform. The payload 404 and the solar panel assemblies 408 may be configured to rotate about the down connect member 406 (e.g., up to 360° rotation or more), for instance to align the solar panel assemblies 408 with the sun to maximize power generation. Example 400 also illustrates a lateral propulsion system 410. While this example of the lateral propulsion system 410 is one possibility, the location could also be fore and/or aft of the payload section 404, or fore and/or aft of the envelope section 402, or any other location that provides the desired thrust vector. Details of the lateral propulsion system 410 are discussed below.

Example Configurations

Figure 5B:
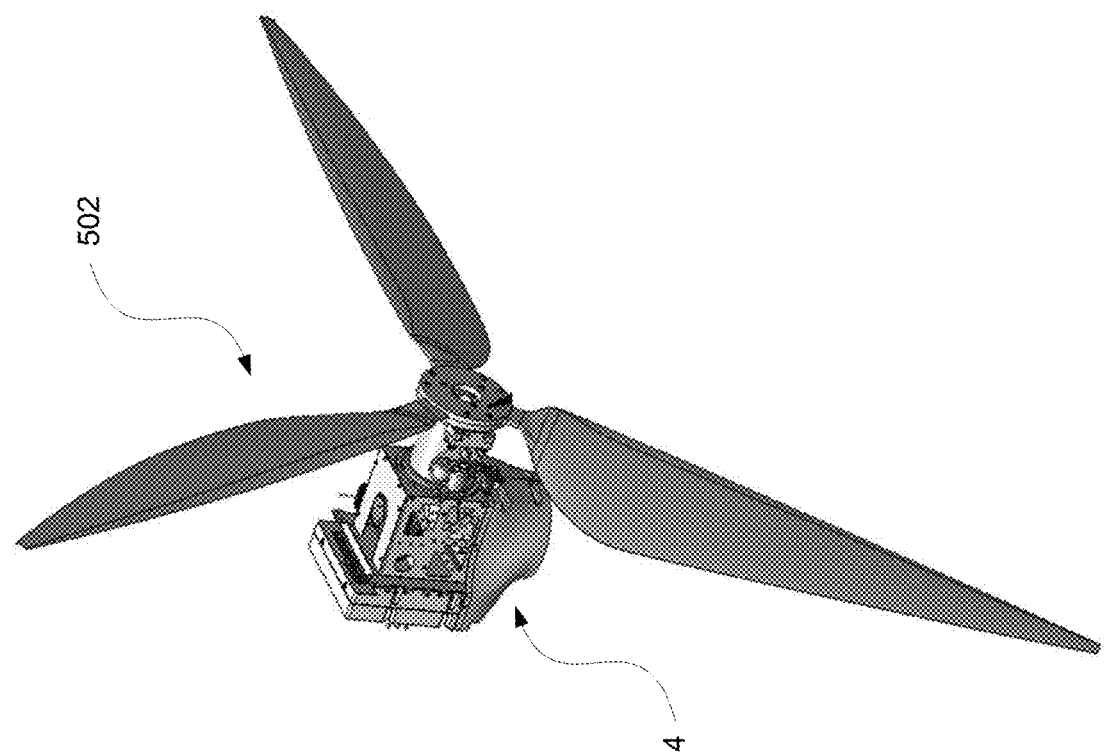
FIGS. 5A-B illustrate an example lateral propulsion system according to aspects of the technology.
Figure 5A:
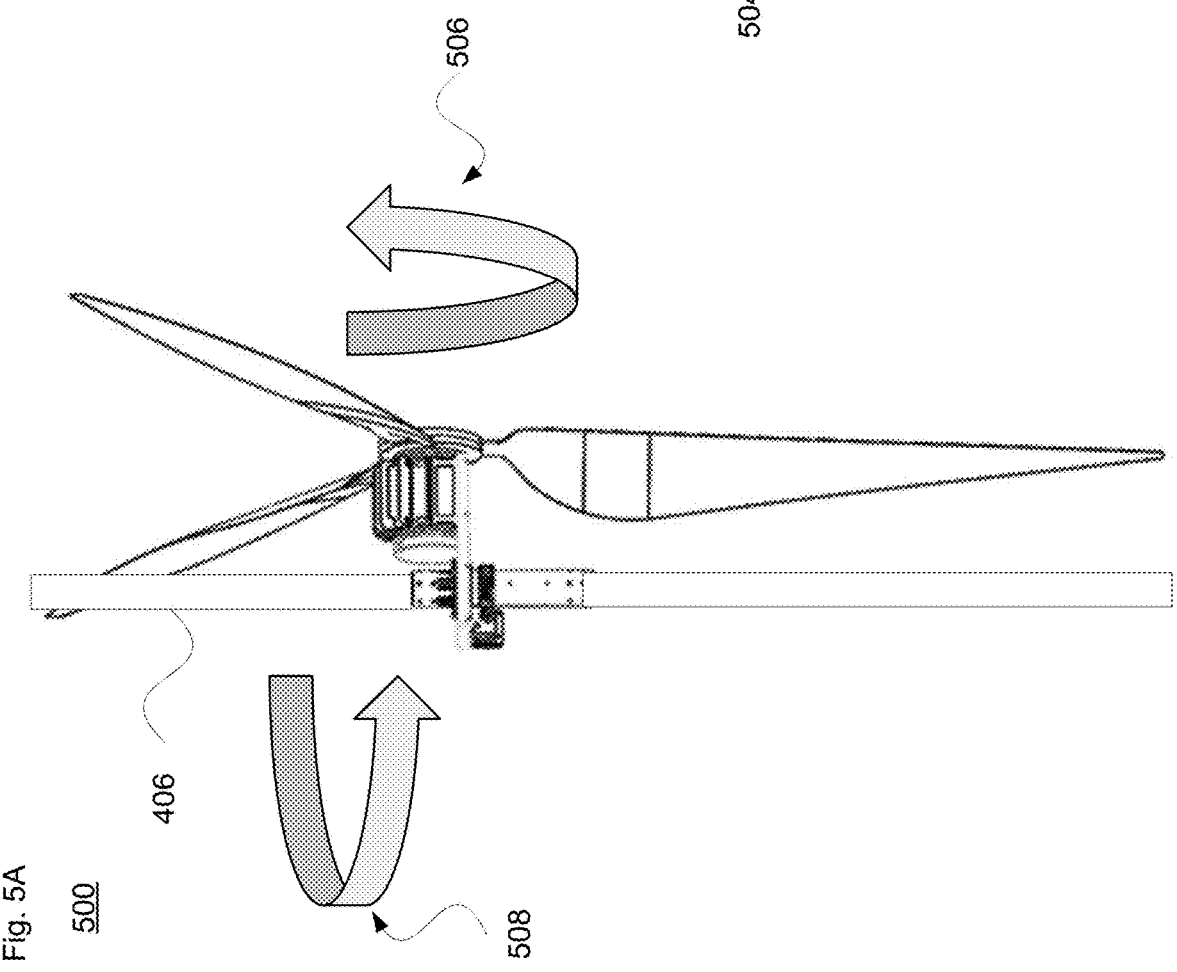

FIG. 5A illustrates an example 500 of the lateral propulsion system 410 of FIG. 4. Example 500 includes a propeller assembly 502 affixed to a control assembly 504, as shown in FIG. 5B. The control assembly 504 is configured to manage operation of the propeller assembly 502, including setting its pointing direction, speed of rotation and determining when to turn on the propeller and for how long. The propeller of the propeller assembly 502 may be arranged generally parallel to the down connect member 406, and is able to rotate in either a clockwise or counterclockwise direction as shown by arrow 506. The control assembly 504 is rotatable about a longitudinal axis of the down connect member 406 (e.g., up to or more than 360° rotation) as shown by arrow 508, changing the pointing direction of the propeller assembly 502 in order to change the balloon's heading.

While this configuration or other similar configurations gives the lateral propulsion system 410 two degrees of operational freedom, additional degrees of freedom are possible with other pointing mechanisms or air-ducting mechanisms. This flexible thrusting approach may be used to help counteract continually changing wind effects. Rotation of the control assembly 504 and propeller assembly 502 about the down connect member 406 is desirably independent of rotation of the solar panel assemblies (and/or payload) about the down connect member 406.

Figure 6A:
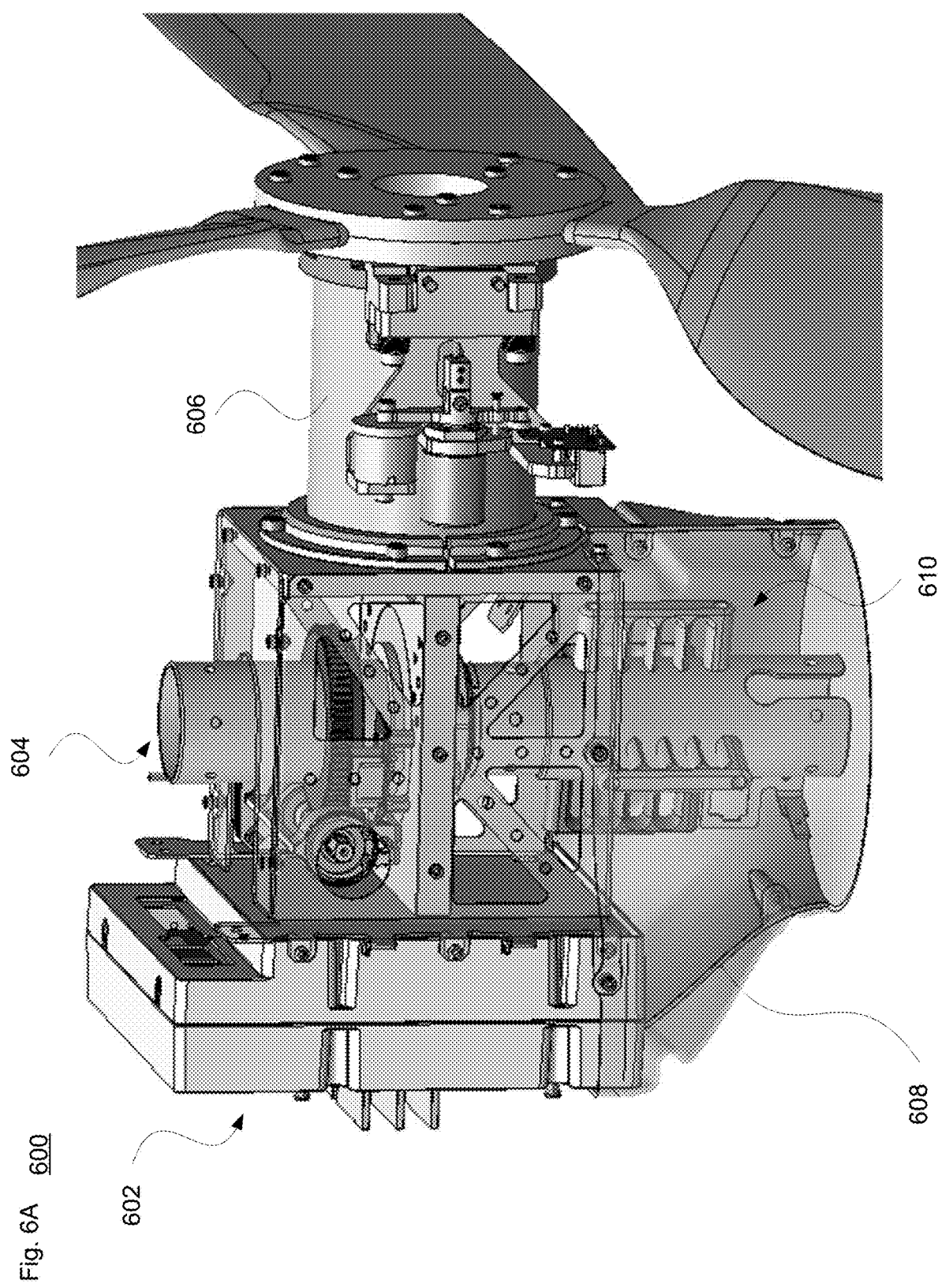
Figure 6C:
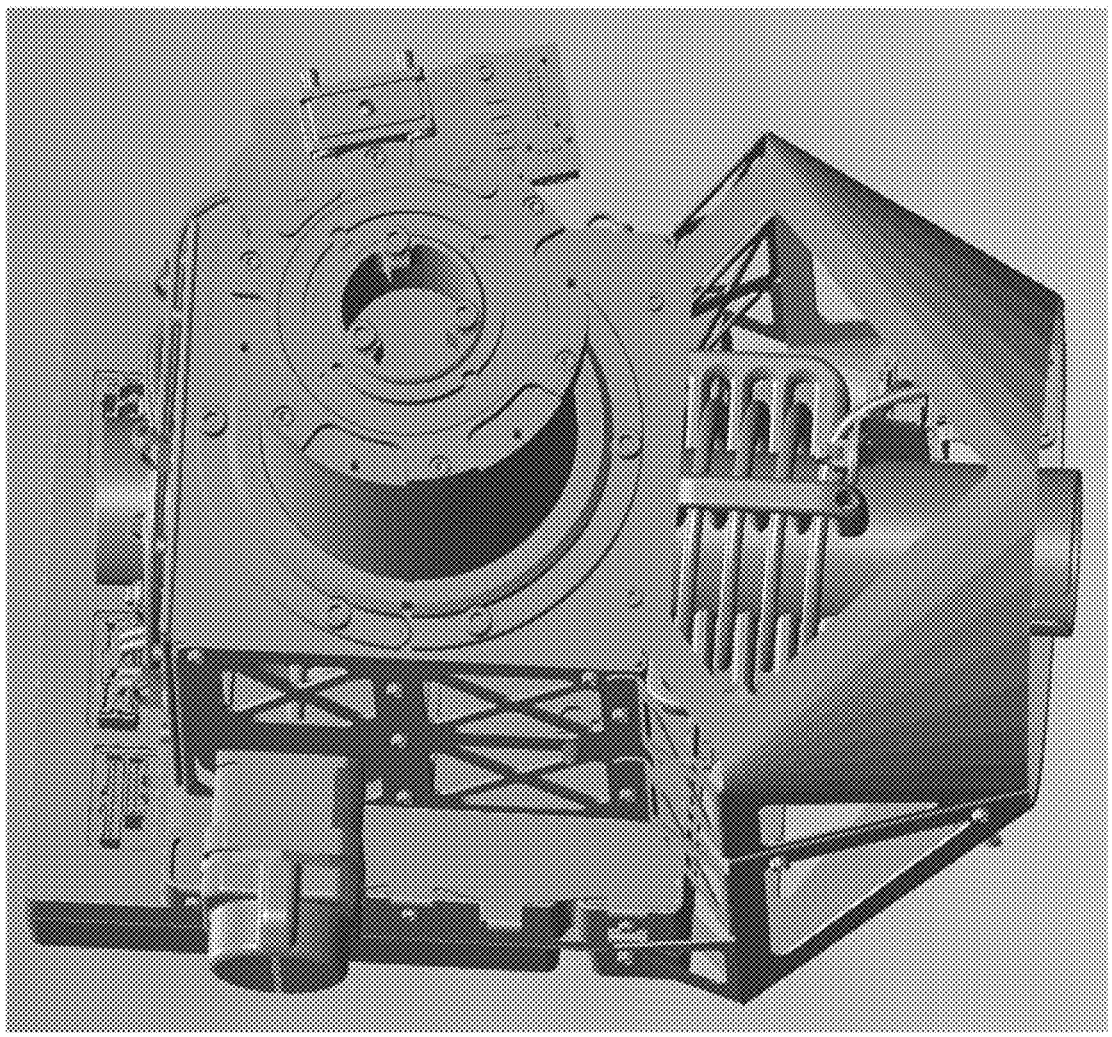

FIGS. 6A-B provides enlarged views 600 and 620, respectively, of the control assembly 504 of FIG. 5, and FIG. 6C illustrates a front perspective view 640 of the control assembly. The control assembly may include an electronics module 602 for controlling operation of the assembly, a coupling section 604 that may be part of or otherwise connected to the down connect member, and a propeller motor assembly 606. As shown, an outer cover or shroud 608 encompasses a cable management structure 610, which is part of or secured to the coupling section 606. Power and data cables can be run through the cable management structure 610, for example connecting the electronics module 602 and other components of the lateral propulsion system to a power supply and/or control system of the payload. The cable management structure 610 is configured for power and/or data cables to be placed in a helical arrangement, with the ability to flex over a wide rotation range of the control assembly and propeller assembly, e.g., up to 360°-400° or more, while providing data/power.

The payload or the lateral propulsion system (or both) may have on-board sensors (e.g., differential GPS or DGPS) to provide accurate attitude and/or position and velocity measurements, enabling highly accurate pointing of the propeller in an absolute direction as well as relative to the payload direction. These sensors are also able to provide measurement of the balloon platform's lateral speed. The propeller motor assembly 606 is configured to rotate the propeller in a clockwise or counterclockwise direction, with or without additional gearing. The propeller motor assembly 606 may be brushless, which can generate more torque than a brush-type motor. By way of example, the brushless motor may be a 300 W-1000 W motor, which is capable of rotating the propeller between 900-2500 rpm or more. The motor may employ a cooling system, for instance using cooling fins or air ducts (not shown) to remove excess heat from the motor or electronics. The system may only need to drive the propeller to achieve a balloon lateral speed of between 1-15 m/s relative to the ground in order to significantly increase the ability of the balloon to stay on or return to station. The speed may be dependent on the location of interest, wind currents at a particular location or altitude, season/time of year, time of day, and/or other factors.

As shown in FIG. 6B, there may be a pointing axis motor assembly 622 in addition to propeller motor assembly 606. The pointing motor assembly 606 is configured to cause the control assembly and propeller assembly to rotate about the down connect member. This may be done by actuating a worm gear mechanism 624. For instance, the pointing motor assembly 606 may include a stepper or brushless DC motor that drives the worm gear mechanism 624, which enables the assembly to rotate about the down connect member by up to 360°-400° or more. Rotation and pointing of the propeller unit could be accomplished with many different configurations of motors and gears or other mechanisms. Also shown in this figure is a braking mechanism 626, which can be used to stop rotation of the propeller.

Figure 7:
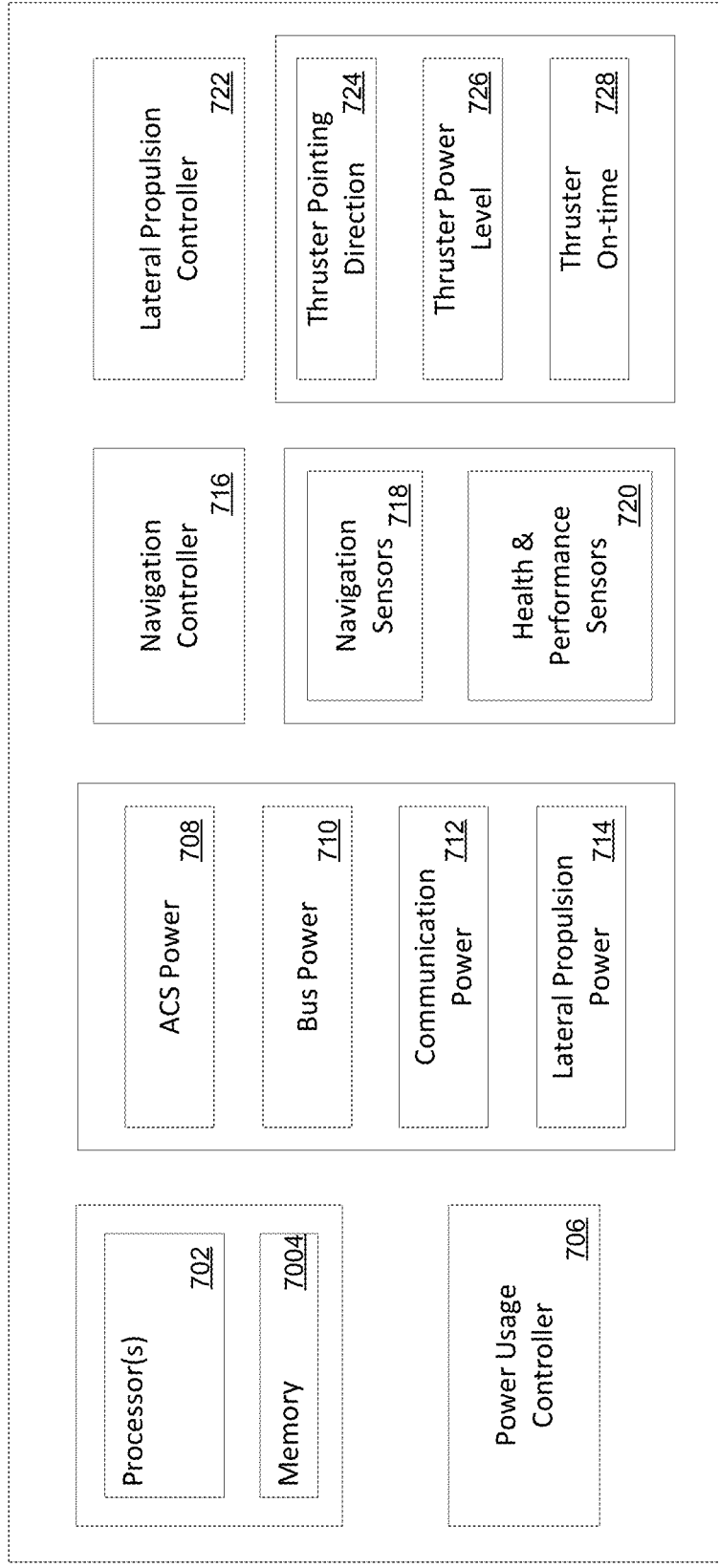
FIG. 7 is a block diagram of an example electronics module in accordance with aspects of the disclosure.

A block diagram of an exemplary electronics module 700 is illustrated in FIG. 7. The electronics module may be part of or separate from the navigation system 316 or the control system 302 of the payload. As shown, a CPU, controller or other types of processor(s) 702, as well as memory 704, may be employed within the electronics module 700 to manage aspects of the lateral propulsion system. A power usage controller 706 may be employed to manage various power subsystems of the electronics module, including for altitude control system (ACS) power 708 (e.g. to control buoyancy of the envelope), bus power 710, communication power 712 and lateral propulsion power 714. The power usage controller 706 may be separate from or part of the processor(s) 702.

A navigation controller 716 is configured to employ data obtained from onboard navigation sensors 718, including an inertial measurement unit (IMU) and/or differential GPS, received data (e.g., weather information), and/or other sensors such as health and performance sensors 720 (e.g., a force torque sensor) to manage operation of the balloon's systems. The navigation controller 716 may be separate from or part of the processor(s) 702. The navigation controller works with system software, ground controller commands, and health & safety objectives of the system (e.g., battery power, temperature management, electrical activity, etc.) and helps decide courses of action. The decisions based on the sensors and software may be to save power, improve system safety (e.g., increase heater power to avoid systems from getting too cold during stratospheric operation) or divert power to altitude controls or divert power to lateral propulsion systems. When decisions are made to activate the lateral propulsion system, the navigation controller then leverages sensors for position, wind direction, altitude and power availability to properly point the propeller and to provide a specific thrust condition for a specific duration or until a specific condition is reached (a specific velocity or position is reached, while monitoring and reporting overall system health, temperature, vibration, and other performance parameters). In this way, the navigation controller can continually optimize the use of the lateral propulsion systems for performance, safety and system health. Upon termination of a flight, the navigation controller can engage the safety systems (for example the propeller braking mechanism) to prepare the system to descend, land, and be recovered safely.

Lateral propulsion controller 722 is configured to continuously control the propeller's pointing direction, manage speed of rotation, power levels, and determine when to turn on the propeller or off, and for how long. The lateral propulsion controller 722 thus oversees thruster pointing direction 724, thruster power level 726 and thruster on-time 728 modules. The lateral propulsion controller 722 may be separate from or part of the processor(s) 702. Processor software or received human controller decisions may set priorities on what power is available for lateral propulsion functions (e.g., using lateral propulsion power 714). The navigation controller then decides how much of that power to apply to the lateral propulsion motors and when (e.g., using thruster power level 726). In this way, power optimizations occur at the overall system level as well as at the lateral propulsion subsystem level. This optimization may occur in a datacenter on the ground or locally onboard the balloon platform.

The lateral propulsion controller 722 is able to control the drive motor of the propeller motor assembly so that the propeller assembly may operate in different modes. Two example operational modes are: power control or rotational velocity control. The electronics module may store data for both modes and the processor(s) of the control assembly may manage operation of the drive motor in accordance with such data. For instance, the processor(s) may use the stored data to calculate or control the amount of power or the rotational propeller velocity needed to achieve a given lateral speed. The electronics module may store data for the operational modes and the processor(s) of the control assembly may manage operation of the drive motor in accordance with such data. For instance, the processor(s) may use the stored data to calculate the amount of current needed to achieve a given lateral speed. The processor(s) may also correlate the amount of torque required to yield a particular speed in view of the altitude of the balloon platform.

The processor(s) may control the drive motor continuously for a certain period of time, or may cycle the drive motor on and off for selected periods of time, e.g., using pulse width modulation (PWM). This latter approach may be done for thermal regulation of the drive motor. For instance, the propeller may be actuated for anywhere from 1 second to 5 minutes (or more), and then turned off to allow for motor cooling. This may be dependent on the thermal mass available to dissipate heat from the motor.

As noted above, the lateral propulsion controller 722 regulates the thruster pointing direction 724, such as by causing the pointing motor assembly to drive the worm gear mechanism in a first direction to rotate clockwise about the down connect longitudinal axis or in a second direction to rotate counterclockwise about the longitudinal axis.

Figure 8:
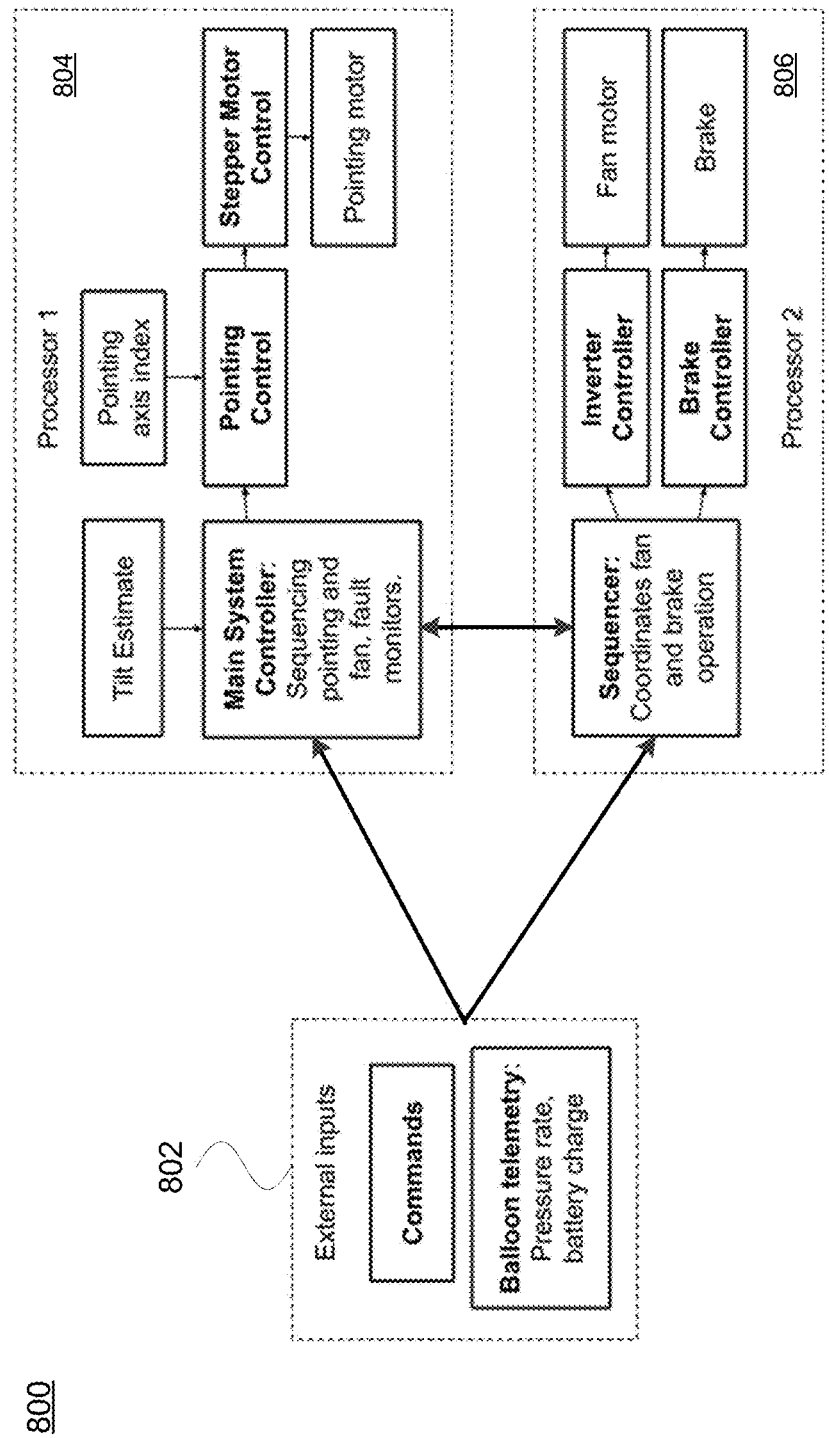
FIG. 8 illustrates an exemplary lateral propulsion controller arrangement in accordance with aspects of the technology.

FIG. 8 illustrates a view 800 of an exemplary functional implementation of the lateral propulsion controller. In this example, external inputs 802, such as control commands and/or balloon telemetry information (e.g., pressure rate, battery charge, etc.) are received and provided to one or more processors of the electronics module. For instance, a first processor 804 may control operation of the pointing axis motor assembly and a second processor 806 may control operation of the propeller motor assembly. Here, by way of example, tilt estimate information may be provided to a main system controller or control module that evaluates the estimated tilt information and other data (e.g., fault monitors, sequencing and pointing information, etc.), and provides that information to a pointing control module. The pointing control module also receives a pointing axis index, which can indicate the pointing position of the propeller relative to the down connect member, how many degrees of rotation the propeller has moved relative to a default position, etc. In this example, such information is used by a stepper motor control module to control operation of the pointing axis motor assembly, for instance by causing it to rotate in a clockwise (or counterclockwise) direction once a threshold rotation amount has been exceeded (e.g., 320°) or a maximum rotation amount has been reached (e.g., 360° or 400°).

Figure 9A:
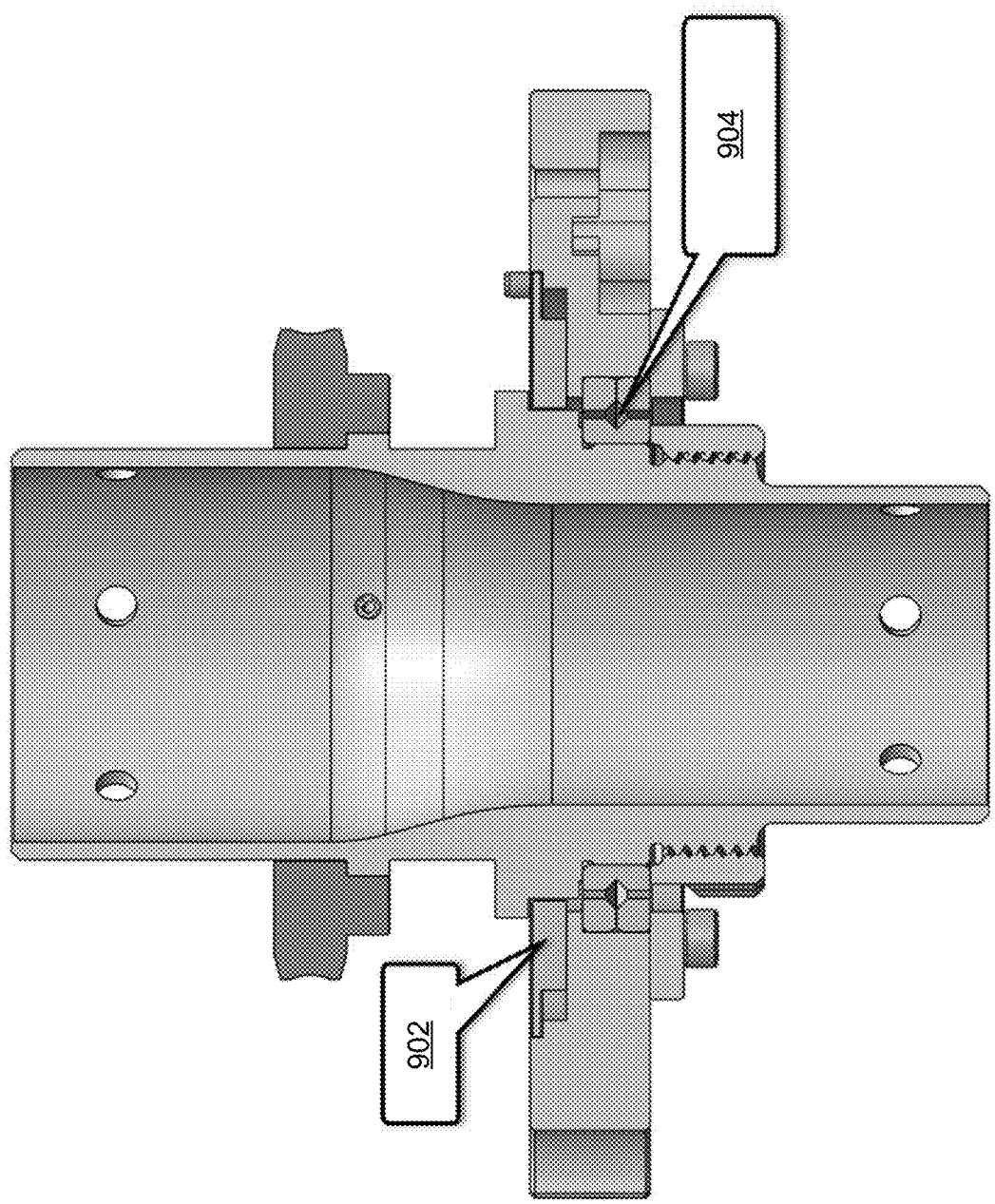
FIGS. 9A-B illustrate a hard stop structure in accordance with aspects of the disclosure.
Figure 9B:
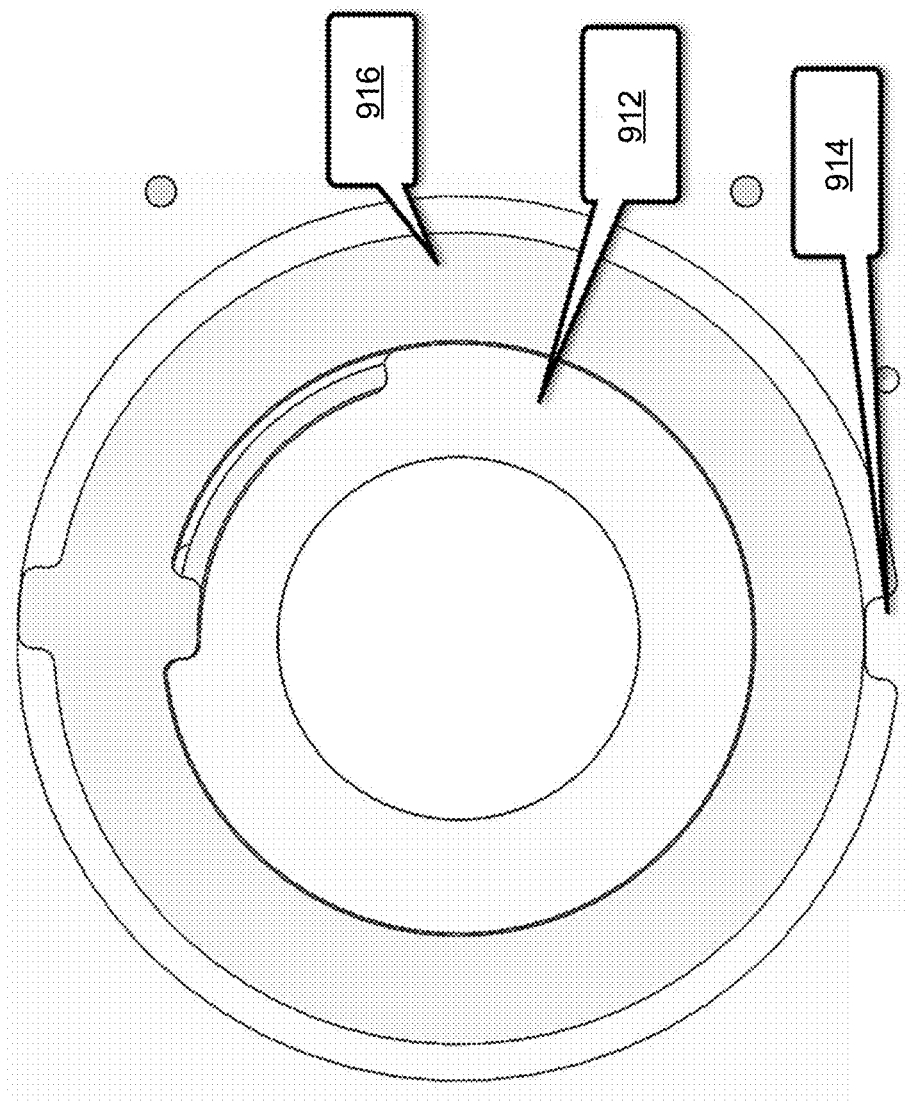

For example, FIG. 9A illustrates a cross-sectional view 900 of the coupling section and FIG. 9B illustrates a top-down view 910 of the coupling section, which illustrates one example of a hard stop structure to prevent further rotation of the propeller assembly once the maximum rotation amount has been reached. As shown in FIG. 9A, the coupling section may include a hard stop ring member 902 and a cross roller bearing 904. The top-down view illustrates a shaft 912 of the coupling section, an outer housing 914, and a stopping element 916 disposed between the shaft 912 and outer housing 914. This arrangement limits movement of the power and data cables during operation of the lateral propulsion system Helical Structure There are different ways to provide data and/or power to rotatable components. For instance, slip rings and flat flexible cables can be used. However, in environments with extreme conditions, such as the very low temperatures of the stratosphere, these types of solutions may not be sufficiently reliable. Slip rings and flat flexible cables may also be more expensive solutions compared to the helical cable management system discussed herein. Further complicating matters is that the rotatable system may be inaccessible once deployed (e.g., launched into the stratosphere), and may experience tens of thousands of rotations (or more) during the lifespan of the system. Extensive repeated rotations may cause wear and tear on the slip ring, crimping or metal fatigue of the flat flexible cable, or other issues that could result in a system failure. Even intermittent signal or power loss due to a poor connection could significantly impact system operation.

Another approach involves using power and data cabling that is arranged in a particular configuration to avoid such issues. Providing electrical connections between two points that rotate relative to each other presents challenges, especially when using wire conductors. The present technology permits rotation between the end points of a conductor or set(s) of conductors without violating the minimum bend radius of the conductor, without twisting the conductor, and minimizing the fatigue on the cable to prevent the conductor from cracking. This is accomplished by winding the conductor(s) in a helical shape around the axis of rotation (e.g., about the down connect member), which distributes the deformation of the conductor along the helical length of the conductor. When the system is rotated in a first direction (e.g., clockwise), the diameter of the helix increases. When rotated in the opposite direction (e.g., counterclockwise), the diameter of the helix decreases. A structure is used to maintain the distance between helical turns (shape of the helix) while permitting expansion and contraction of the helix diameter.

The number of rotations is limited by physical parameters such as helical diameter, minimum bend radius of conductor, helix length, helix height, conductor or cable stiffness, and other factors. The diameter, number of turns, and helix height are variables that can be adjusted to accommodate the amount of rotation required, stiffness of the cable, packaging constraints, etc. The length of the rotated and un-rotated states for the cable helix are the same. An initial step is to figure out the amount of rotation necessary. Then diameter change and number of turns can be picked based on height and length restraints. For example, an extremely large initial diameter and small final diameter with one initial turn could be a solution. Another solution could be only a small diameter change from initial and final and many turns. All of this is calculated using the equation bellow, noting that the length of the un-rotated state=length of the rotated state.

$$\text{Length of a helix} = \text{number of turns} * (\text{height of one turn}^2 * \text{circumference}^2)^{0.5}$$

This example calculator may be used to determine the total change in diameter of the helix for a given amount of rotation (e.g. 400°) and number of wraps (e.g. 4 "turns") of the cable around the rotation axis. The change in diameter is used for two main aspects. One is to influence the design of the finger components and confirm the cable will not bind against the inner shaft during actuation (in the direction that reduces the helix diameter). More broadly, this approach can be used to determine packaging constraints. The other is that the calculator gives the designer a feel for the total cable deformation with respect to diameter and number of turns. Increasing the diameter and utilizing more turns can reduce the fatigue on the cable, but increases packaging volume. This approach as described above allows for an extended number of rotational cycles to occur without cable failure, such as tens of thousands of cycles or more.

By way of example, the system may need to be able to rotate up to 360° or 400° (or more), and fit within a tube or other housing that has a diameter of between 50-200 mm and a length of up to 75-400 mm. In order to ensure a long operational life (e.g., weeks, months or longer), the system may need to survive 20,000 to 90,000 rotation cycles or more without power or signal loss. The data cable(s) may be, for instance, Cat5, Cat6, Cat7 or Cat8 type cables. The power cable(s) may be, for instance, 12-18 AWG twisted pairs with foil and/or braid shielding. In one example, the braiding may be removed to enhance operational longevity. The cables may have an outer sleeve of Fluorinated Ethylene Propylene (FEP), Polytetrafluoroethylene (PTFE), or other type of flexible sheath.

Figure 10A:
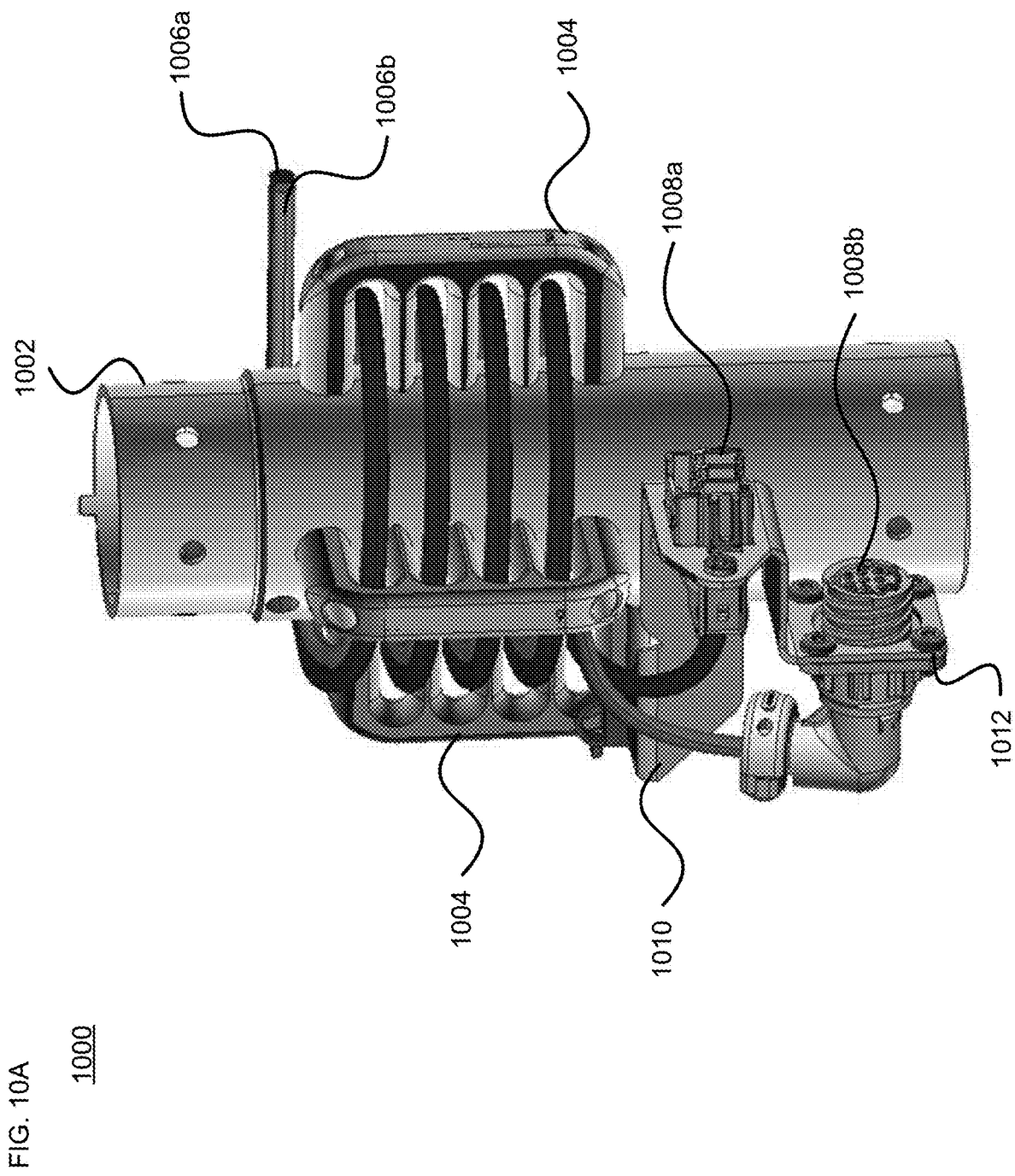
FIGS. 10A-D illustrate a helical cabling arrangement in accordance with aspects of the disclosure.
Figure 10B:
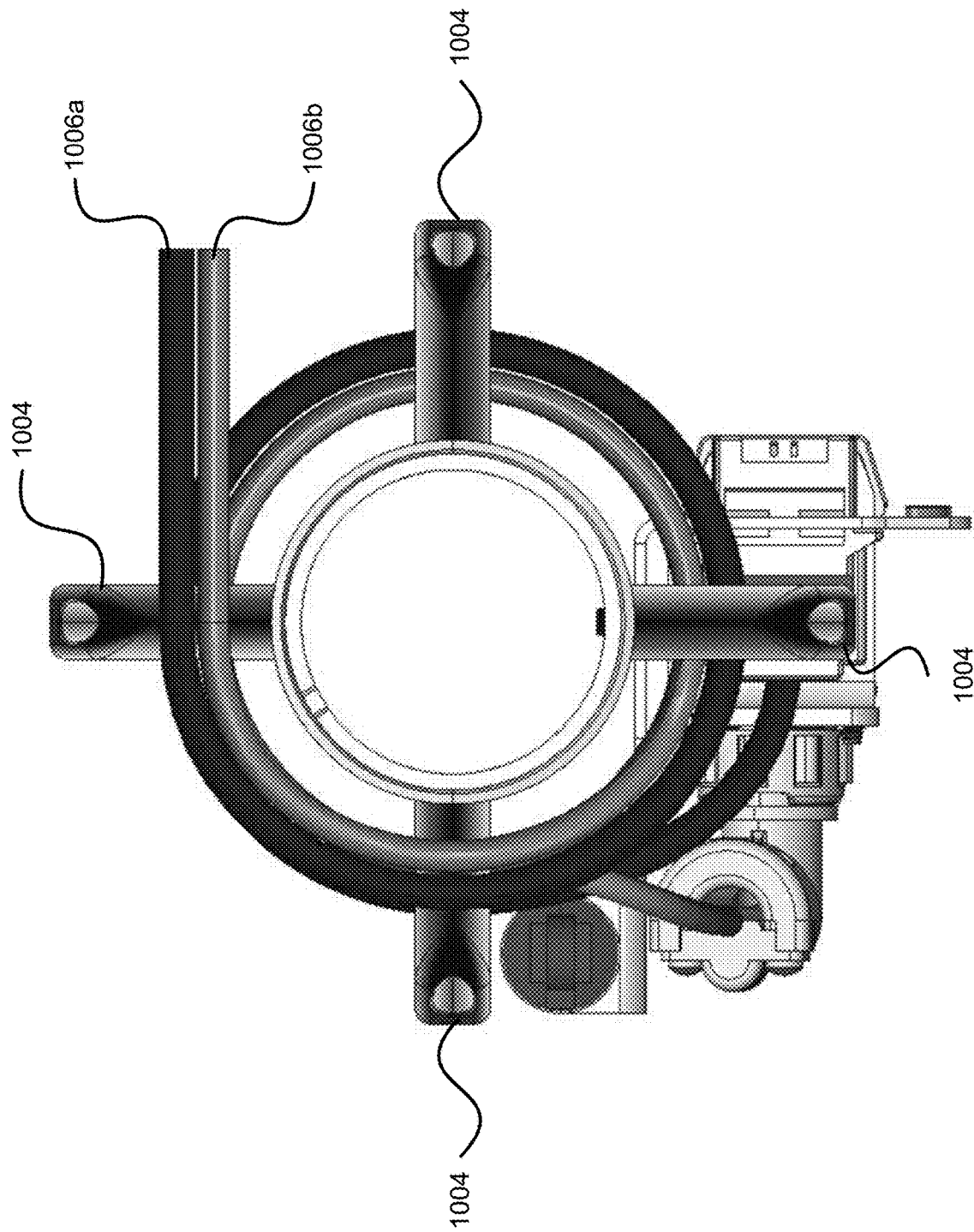
Figure 10D:
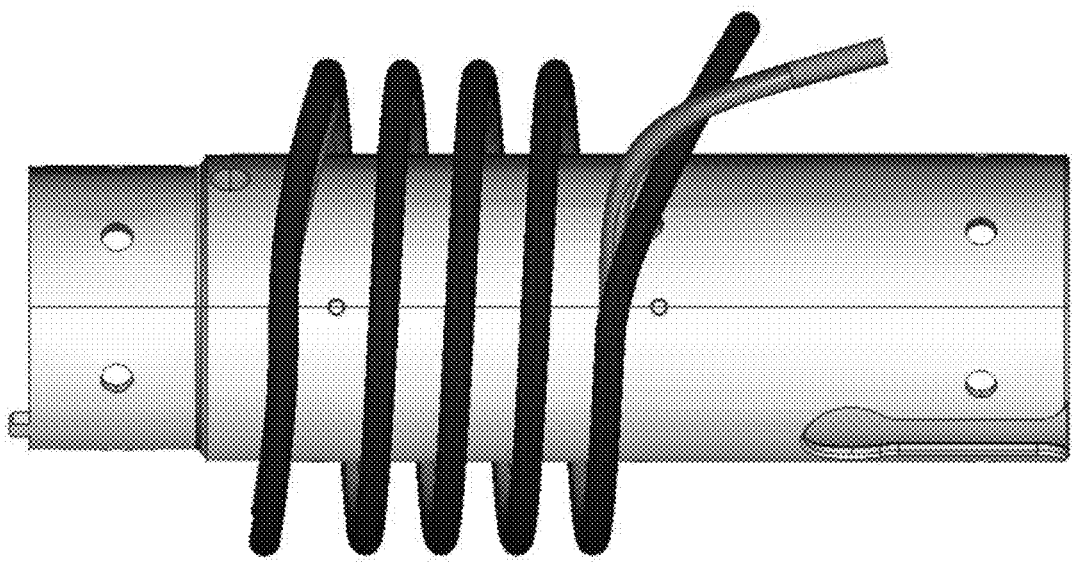
Figure 10C:
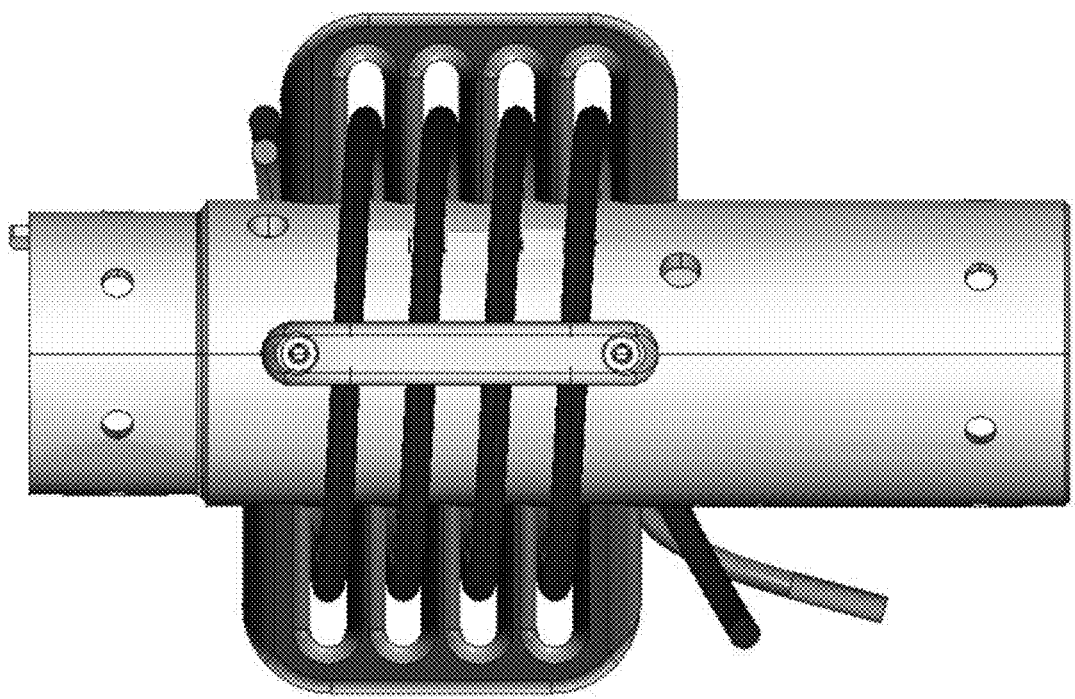

FIGS. 10A-D illustrate one example 1000 of a helical cabling arrangement that satisfies such requirements. As shown in this example, the arrangement includes a tubular shaft 1002, such as the lower portion of the coupling section 604 of FIGS. 6A-B. The tubular shaft 1002 may couple to or be part of the down connect member 406 of FIG. 4. One or more retaining components, such as finger structures 1004, provide spacing for the cable(s) 1006 wound in a helical configuration around the tubular shaft 1002. In this example, a power cable 1006a having a connector 1008a and a data cable 1006b having a connector 1008b are both helically wound around the shaft. As shown in the top-down view of FIG. 10B, four finger structures 1004 are used in this example (e.g., two opposing pairs of finger structures, although more or fewer may be employed. In addition, as seen in this figure, the central opening of the shaft may be hollow. And while only two cables 1006 are shown, a single cable or three or more cables can be helically wound through the cabling arrangement. The helical winding of the cable(s) is shown in the side view of FIG. 10C. FIG. 10D omits the finger structures. As seen in FIG. 10A, a bracket element 1010 may be used to secure an end of one of the cables 1006 to the shaft 1002. A bracket element 1012 may be used to secure an end of the other cable 1006 to the shaft 1002 or another part of the assembly such as bracket element 1010.

Figure 11B:
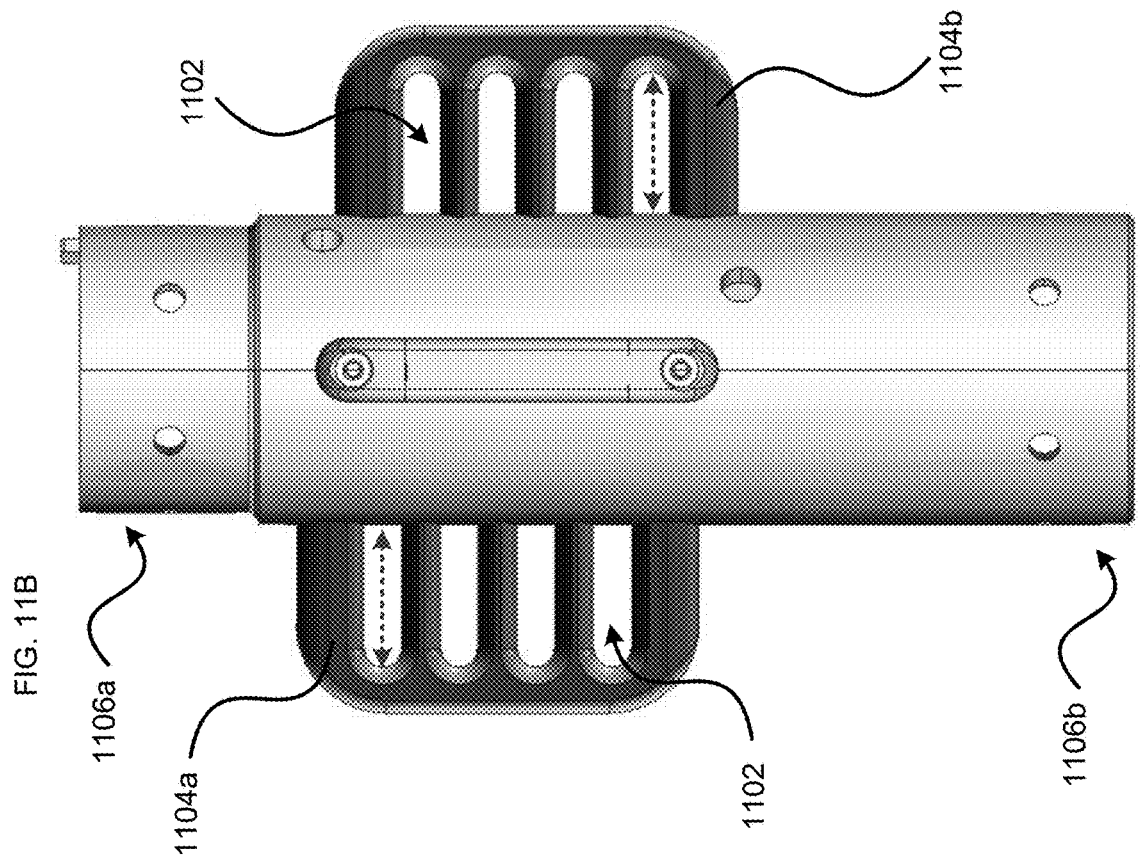
FIGS. 11A-B illustrate a portion of the helical cabling arrangement in accordance with aspects of the technology.
Figure 11A:
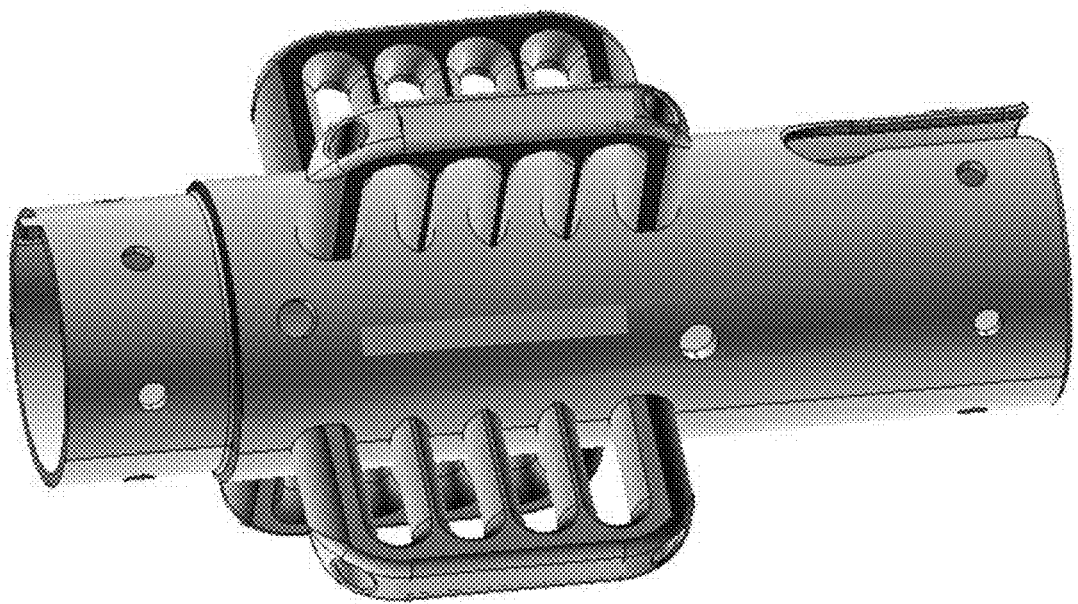

FIGS. 11A-B show helical cabling arrangement 1100 with the cables omitted, in a perspective view (FIG. 11A) and a side view (FIG. 11B). Each finger structure includes a plurality of slots 1102, which are sized to receive the power and/or data cable(s) and allow for helical expansion and retraction as the system rotates. In this example, there are four slots per finger structure. Each finger structure may have the same number of slots, although this is not required. The lateral width of the slots in a given finger structure may be the same width or a different width. The vertical height of each slot may be large enough to receive the connectors 1008, or may only provide sufficient clearance for the cable(s).

Figure 12B:
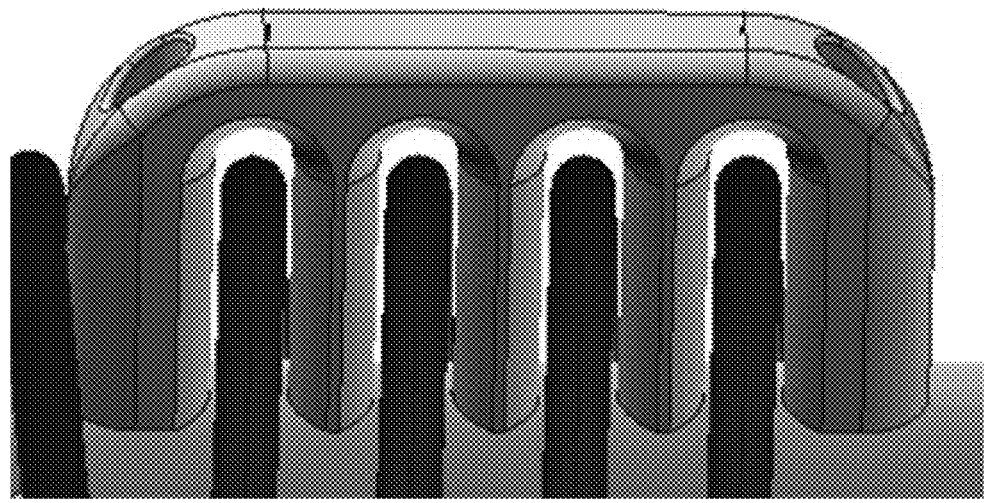
FIGS. 12A-B illustrate decreasing and increasing the helical diameter of cables in accordance with aspects of the technology.
Figure 12A:
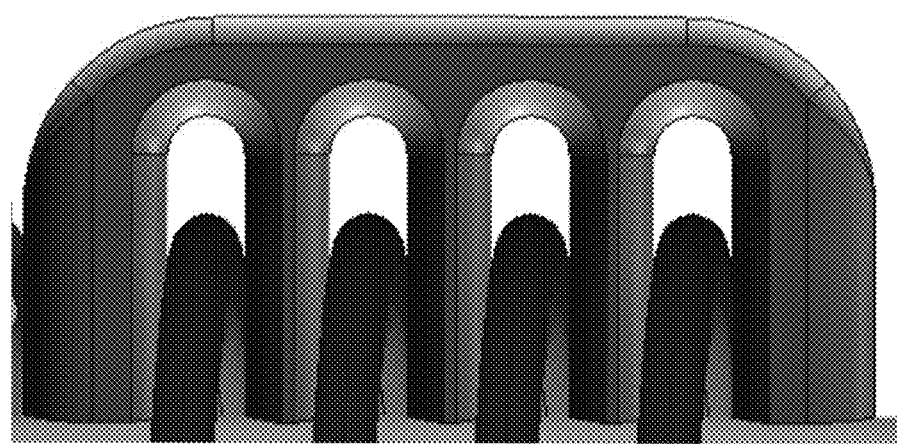
Figure 14D:
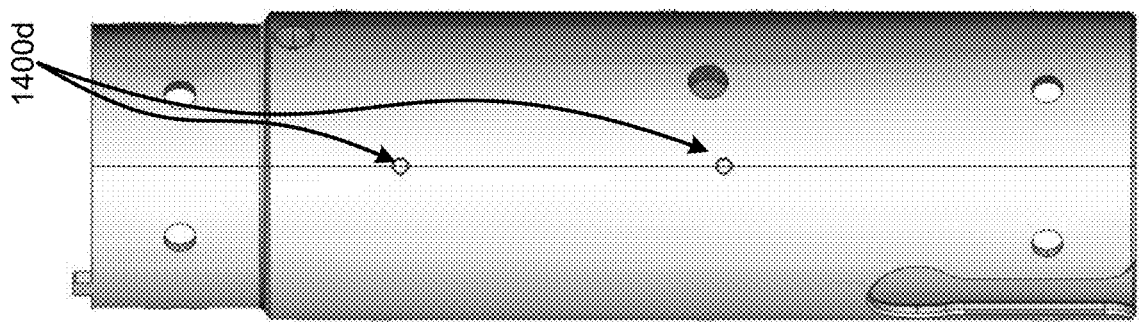
FIGS. 14A-D illustrate a tubular shaft in accordance with aspects of the technology.
Figure 14C:
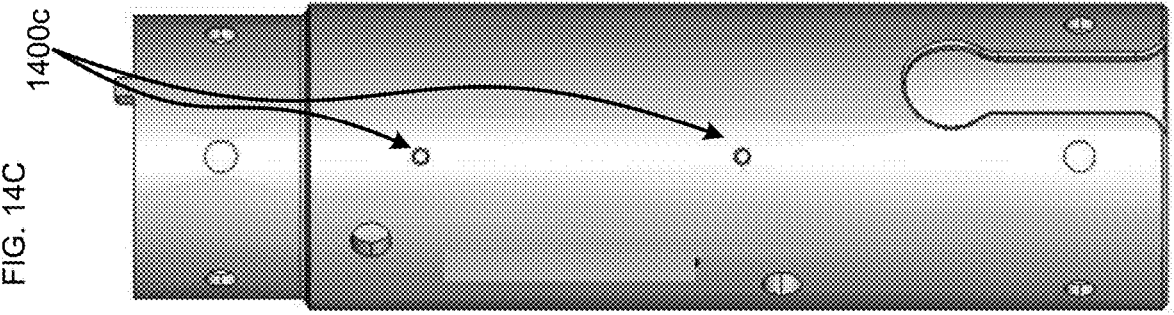
Figure 14B:
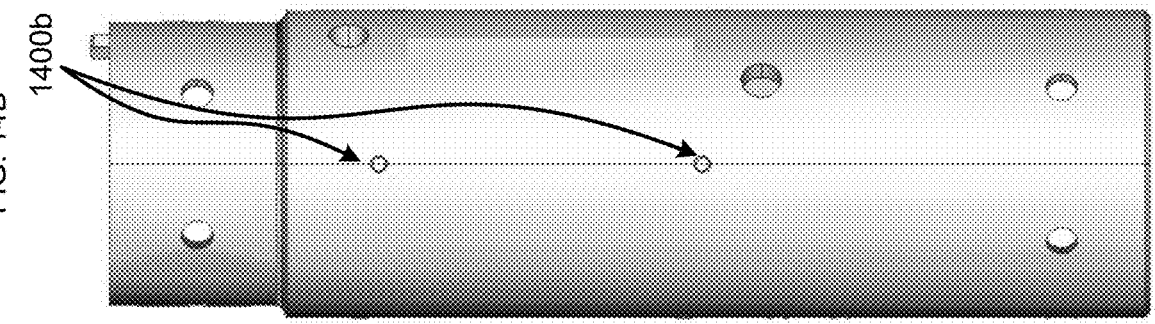
Figure 14A:
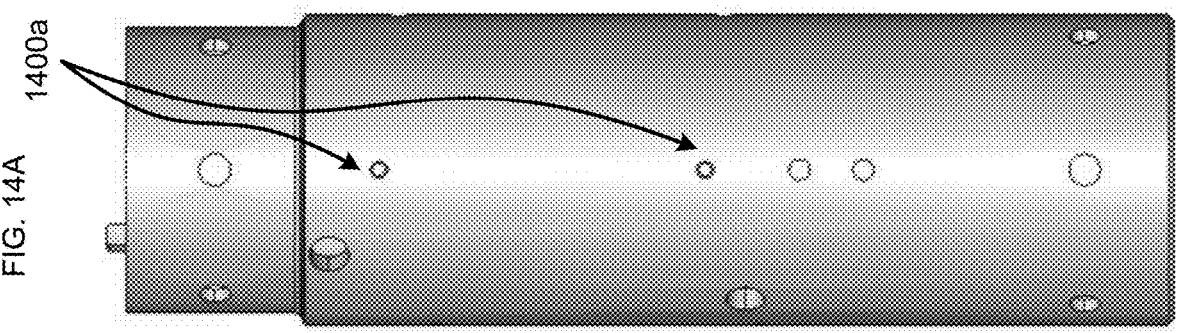

As indicated by the dotted arrows in FIG. 11B, the cables have room to move width-wise as the diameter of the helix increases and decreases. For instance, as shown in FIG. 12A, actuating the pointing motor assembly to cause the propeller to rotate about the axis in a first direction decreases the diameter of the helix and pulls the cables closer to the tubular shaft. And as shown in FIG. 12B, actuating the pointing motor assembly to cause the propeller to rotate about the axis in a second, opposing direction, increases the diameter of the helix and pushes the cables away from the tubular shaft and closer to the outer end of the finger structure.

The finger structures 1004 may be made of plastic or other materials, and may be 3D printed, cast, etc. In one example, the material of the finger structure is selected to have a low coefficient of friction and a smooth surface to reduce the possibility of fraying of the outer sheath of the cable(s). For instance, the contact area may be made as small as possible to prevent degradation of the insulation. The finger structure may be formed as a unitary piece or assembled from two or more pieces. FIGS. 13A-D illustrate side, front, back and end views of an example finger structure. Each slot has a height H and a width W, as illustrated in FIG. 13A. As shown in the front view of FIG. 13B, a pair of through holes 1300 are provided. The through holes are adapted to receive a fastener (not shown), such as a screw or bolt, to secure the finger structure to the shaft.

Returning to FIG. 11B, it can be seen that the finger structures in this example are not arranged at the same heights along the shaft. For instance, finger structure 1104a is located closer to the upper end of the shaft 1106a, while finger structure 1104b is located closer to the lower end of the shaft 1106b. FIGS. 14A-D illustrate four sides of the shaft, which each have a corresponding pair of through holes or other receptacles 1400a, 1400b, 1400c, 1400d, respectively arranged at different heights to accommodate each of the finger structures. Staggering the relative placement (height) of each finger structure about the shaft enables the cables to be efficiently arranged helically. The staggering of the fingers is directly related to the helix angle. So, in one example, with 4 evenly distributed fingers, the stagger distance between each is the helix rise distance in one revolution divided by 4.

Assembly of the Helical Structure

When mounted on the shaft, the slots of the finger structures are enclosed on one side by the shaft, and enclosed on the opposite side by the outer end of the finger structure. As noted above, the vertical height of each slot may be large enough to receive the connectors, or as shown by FIG. 10A, may only provide sufficient clearance for the cables themselves. The former approach is feasible, but may provide too much vertical height or lateral width for the cables to move within each slot, which can cause the cables to bind or twist if too much space is provided with multiple cables in the helix. In the latter approach, the cables are placed in the helical arrangement and then the connectors are affixed to the ends of the respective cables. This can be difficult after arranging the wiring due to tight clearance of system components, and because the length of the cables is constrained. This makes it harder to use cable connector tools (e.g., crimper, punch down tool, etc.), which can considerably slow the assembly process.

In one alternative, the finger structures may have multiple pieces including a removable or adjustable outer end of the structure. This would allow for the finger structures to be affixed to the shaft first, and then allow for helical winding of the cables along the finger structures. However, it may be desirable for the finger structures to be one-piece units, for instance to reduce the number of components or reduce the likelihood of failure of the overall structure after the HAP is launched.

It may also be desirable to quickly and easily assemble the system prior to launch. The approach discussed below uses a tool including a pair of temporary assemblies that are removably secured to the shaft. The tool can significantly reduce assembly time and complexity while allowing for cables that already have connectors on the ends thereof. As discussed further below, the tool allows creating of a set of loops of fully connectorized cables around the shaft, while maintaining the desired order and spacing of the cables in relation to one another and the tube.

Figure 15B:
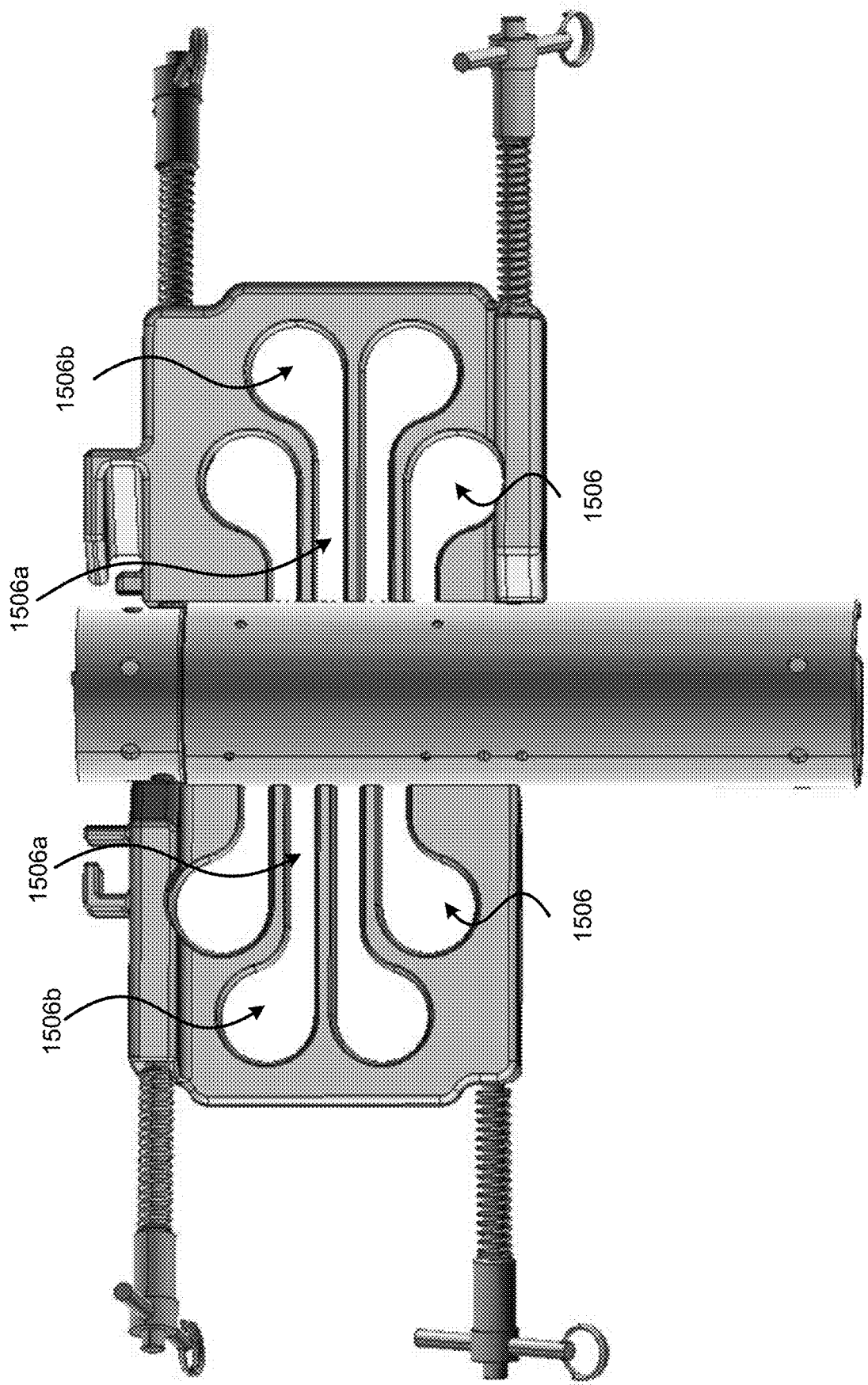

FIG. 15A illustrates an example of a quick assembly tool 1500, and FIG. 15B illustrates the tool 1500 removably secured to the shaft. As shown, there is a first helix "ear" 1502a and a second helix ear 1502b (e.g., a right ear and a left ear). A plurality of slots 1506 are disposed in each ear. The slots have a first end 1506a adjacent to the shaft and a second end 1506b remote from the shaft (when the ears are coupled thereto). In this example, the ends 1506b of the slots opposite from the shaft are enlarged, so that the connectorized cables can be easily inserted therethrough. In another example, the enlarged area may be along the end 1506a, or in a region between the ends 1506a and 1506b. The enlarged area may be generally circular, bulbous or have another geometric shape. The other part(s) of the slot 1506 are smaller than the enlarged portions, in particular smaller than the size of the connector(s) but greater than the diameter of the cable(s). In the example shown in FIG. 15B, at least some of the slots have different lengths. For instance, as shown the lengths of the top- and bottom-most slots are shorter than the length(s) of the middle slot(s). By way of example, the lengths of the inner slot(s) may be 50-100% longer than the top and bottom slots. As seen in FIG. 15B, the enlarged areas of the two central slots may extend away from one another. Similarly, the enlarged areas of the two outer slots may extend away from one another. In this case the slots are different lengths because the connectors may be large and the cable spacing required may be tight. If the spacing required between cables is larger, and/or the connectors are smaller, in another configuration it would be possible to have equal length slots with bulbs located at either end of the slots.

Each ear 1502 receives a pair of fastener members 1504a and 1504b, which are secured to receptacles in the shaft. The fastener members 1504 may have different ways to connects to the ears 1502. For instance, the fastener members 1504 may be threaded, or may include springs and T-handles with quick release pins as shown. This latter approach enables toolless installation, retention and removal of the fastener members 1504. FIG. 15C illustrates a pair of receptacles 1508a and 1508b. As shown, the receptacles 1508 are placed at different locations along the shaft than the pairs of receptacles 1400a, 1400b, 1400c, 1400d, which are used to receive the finger structures. And in this example, while the pairs of receptacles 1400a-d are aligned vertically along the shaft, the pairs of receptacles 1508a and 1508b may be offset vertically.

Figure 16D:
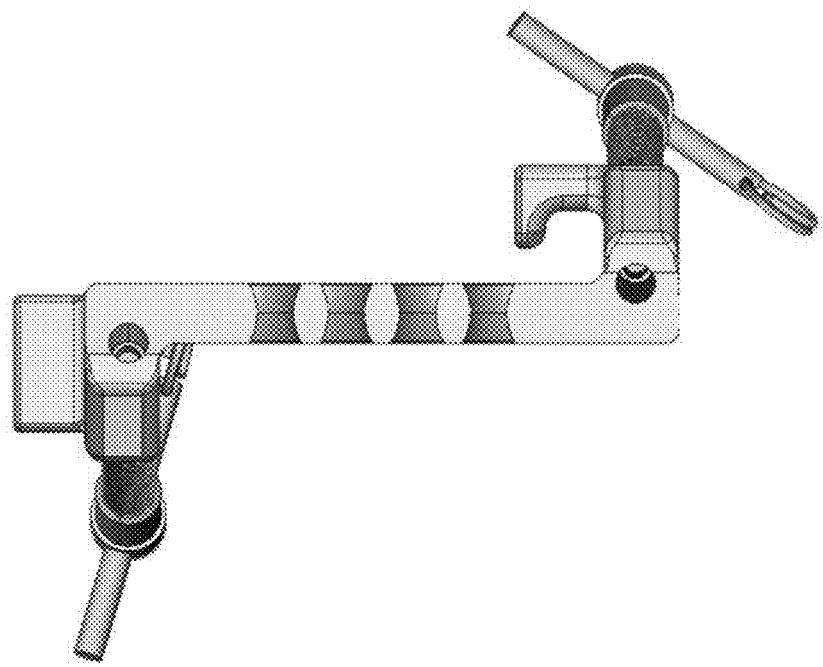
Figure 16C:
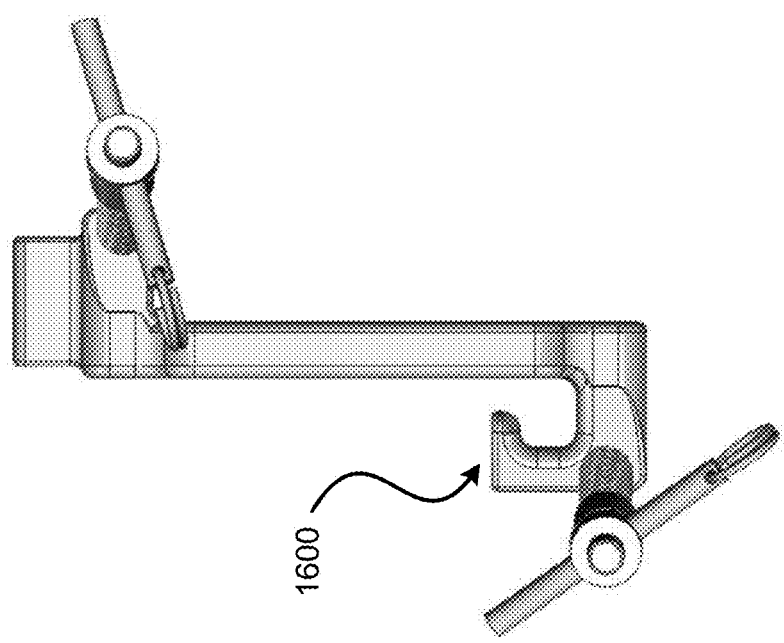
Figure 16F:
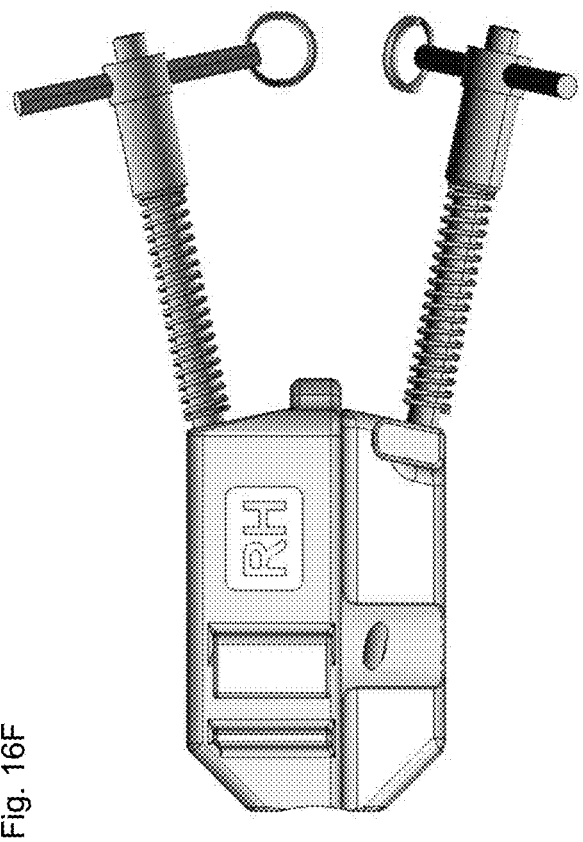
Figure 16E:
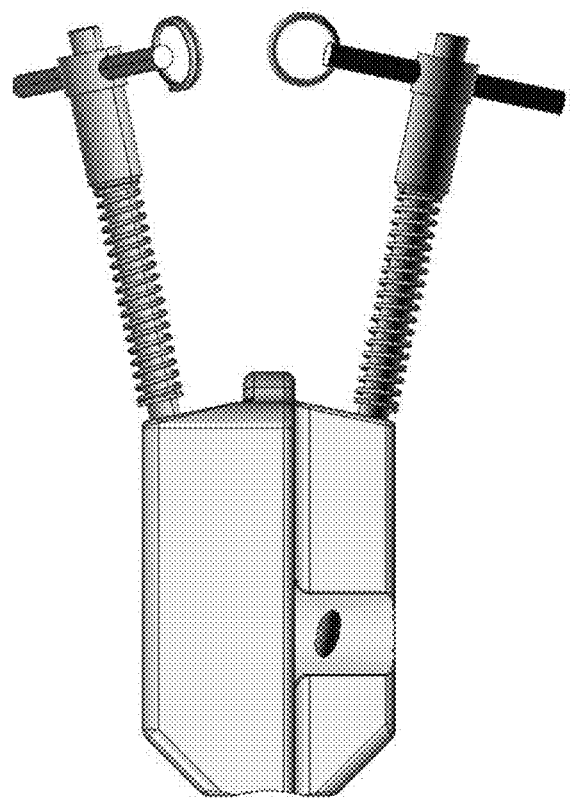
Figure 17B:
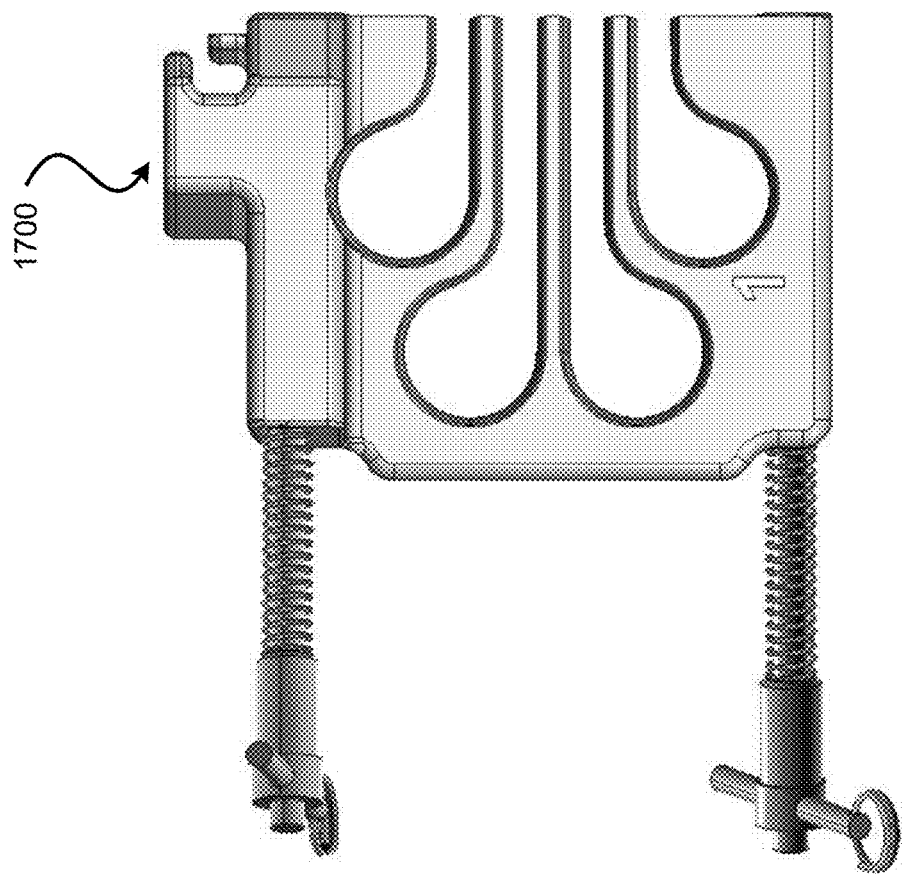
FIGS. 17A-F illustrate a second tool mechanism in accordance with aspects of the technology.
Figure 17A:
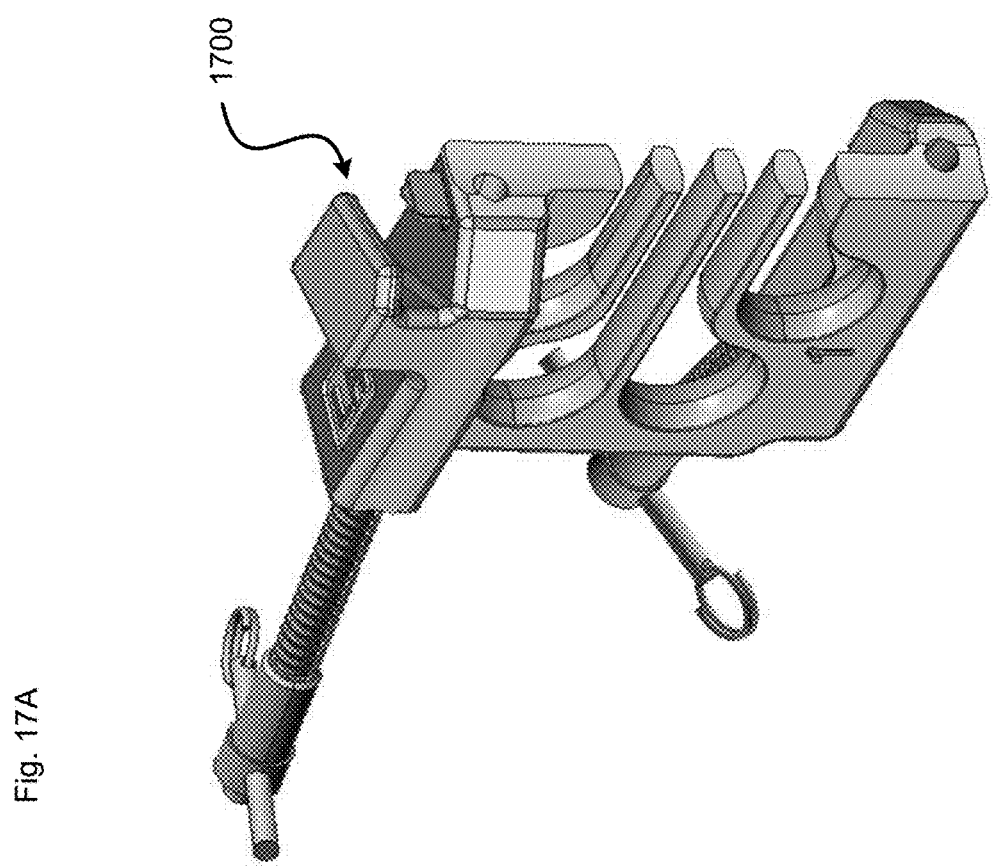
Figure 17D:
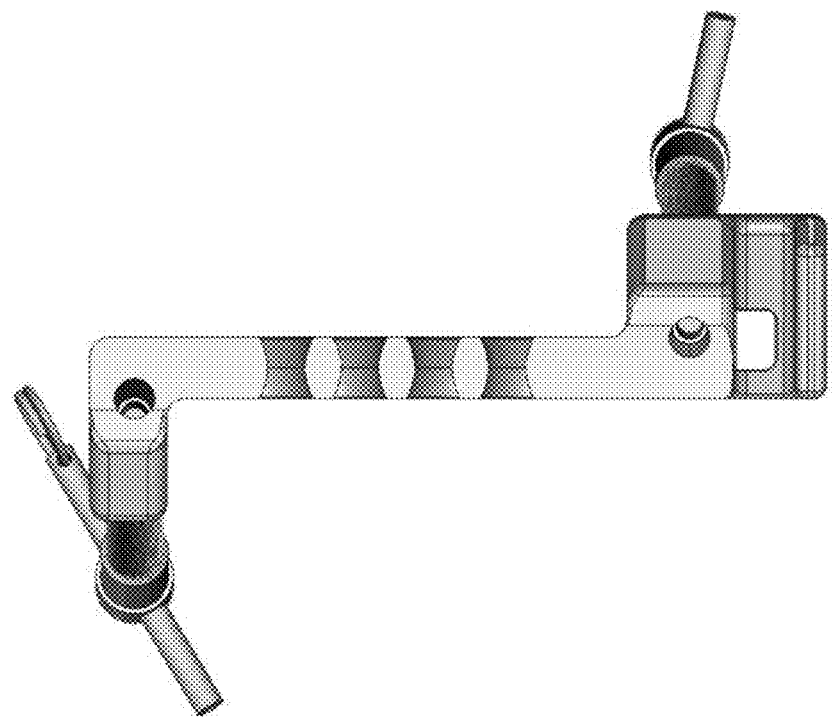
Figure 17C:
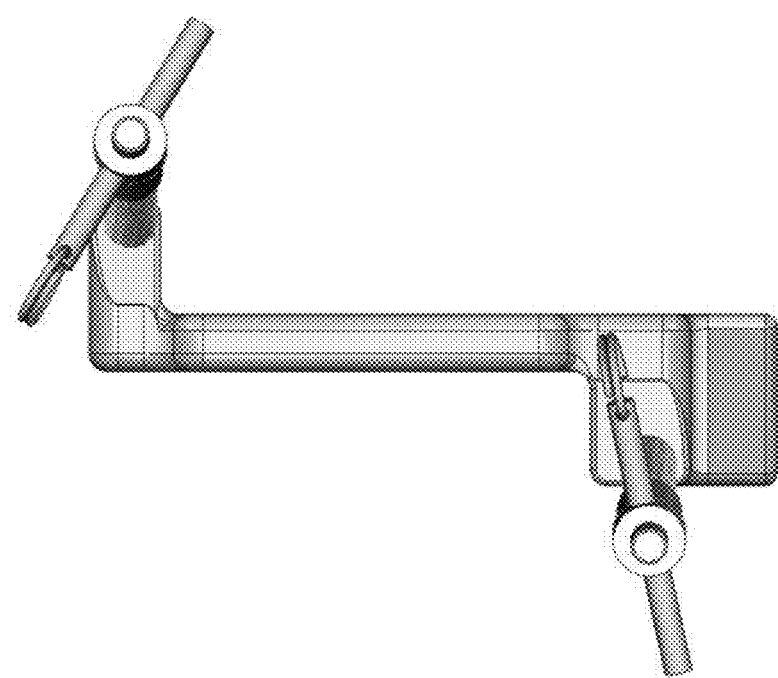
Figure 17F:
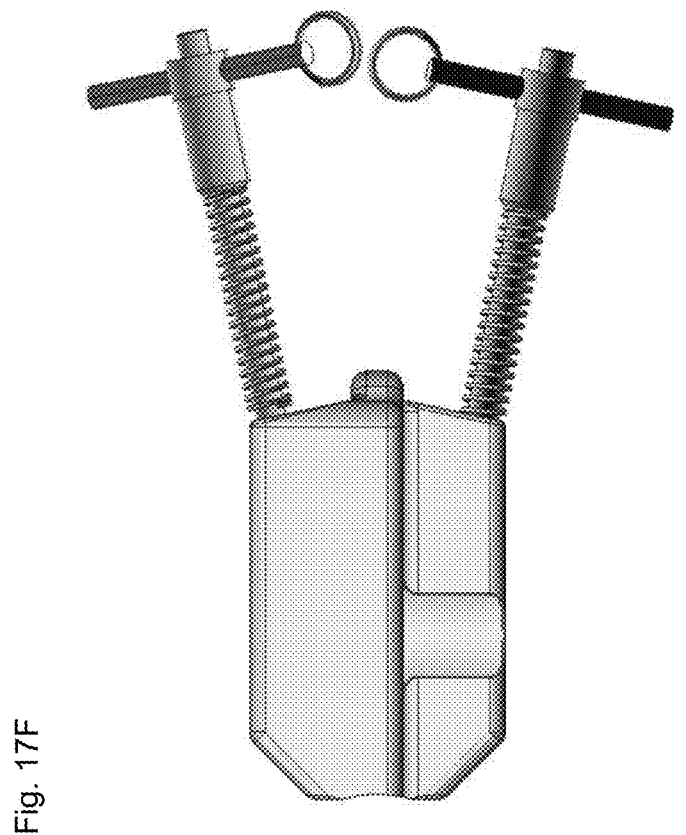
Figure 17E:
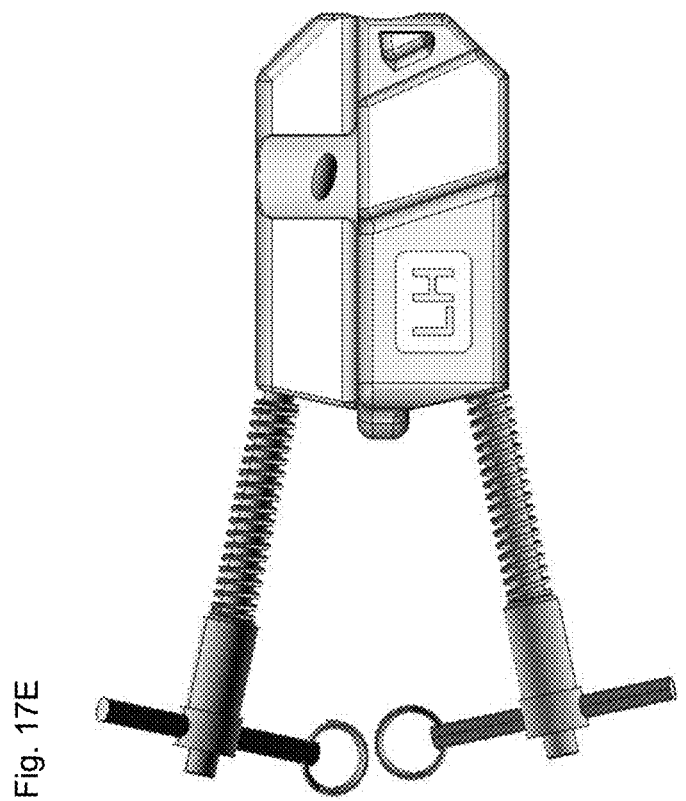

FIG. 16A-F illustrate an example of the first (e.g., right) ear 1502a, and FIGS. 17A-F illustrate an example of the second (e.g., left) ear 1502b. As shown in FIG. 16F, the "right" ear may be marked with a symbol, text or other label such as "RH", while as shown in FIG. 17E, the "left" ear may be marked with a symbol, text or other label such as "LH". These labels are used to quickly position the ears on the appropriate sides of the shaft, for instance using a slot arranged on the base of the shaft (see FIG. 14C) as a marker to differentiate the right side from the left side. As seen in FIGS. 16A-B, the right ear may have a first temporary retaining feature 1600 and a second temporary retaining feature 1602. And as seen in FIGS. 17A-B, the left ear may include a temporary restraining feature 1700. The restraining features are used to temporarily secure the connectorized cabling during or after winding.

Figure 18:
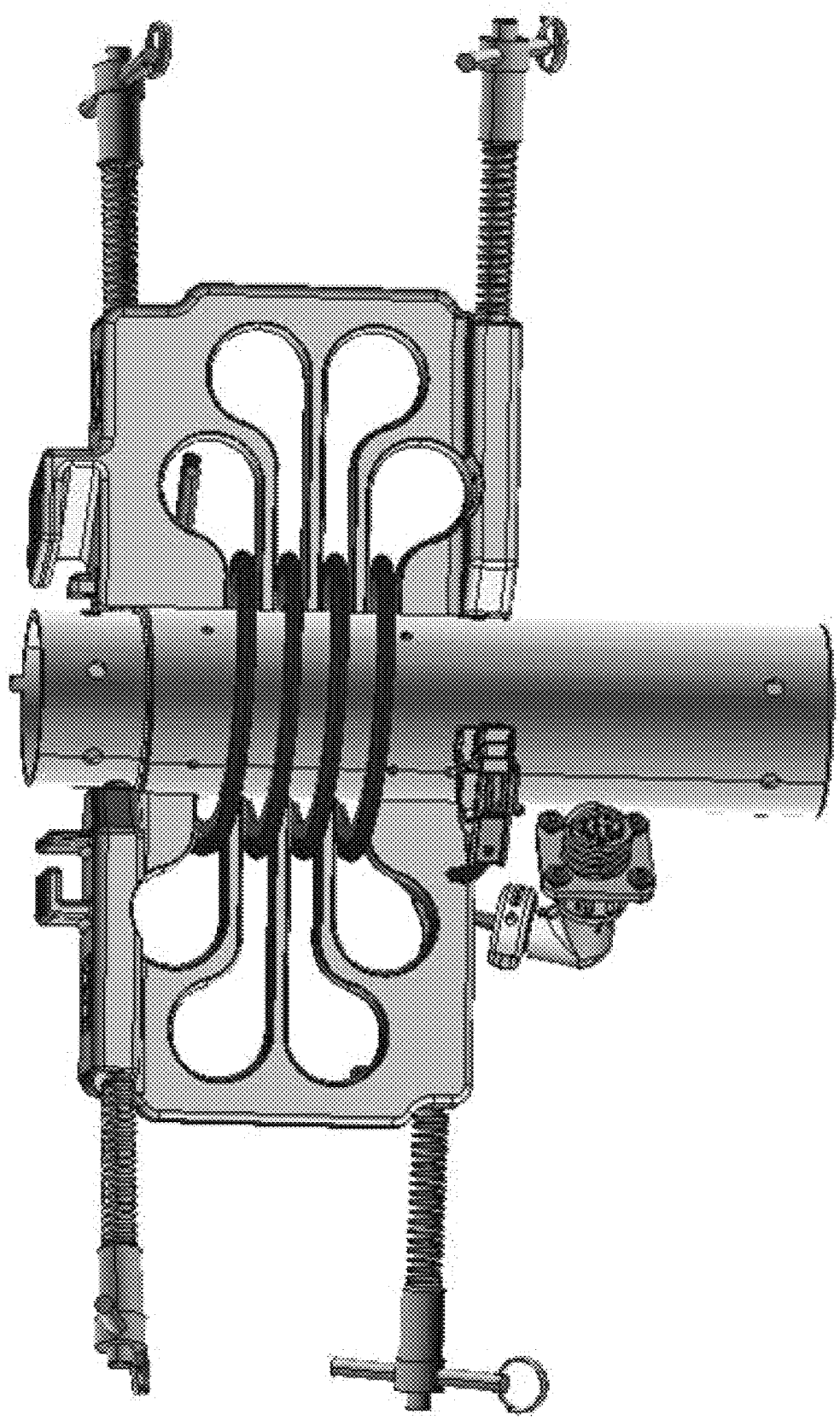
FIG. 18 illustrates cabling wound in a helical arrangement with the tool mechanisms in accordance with aspects of the technology.

Once the ears are temporarily secured to the shaft using the threaded fastener members 1504, the connectorized cables may be fed through the slots of the ears as follows. The ends of the power and data cables to be connected to the lateral propulsion assembly may first be fed through the lower slot of the left ear, labeled as "1" in FIG. 17 B. In one example, a data cable may be fed through first, followed by a power cable (or vice versa). In another example, multiple cables may be fed through at the same time. Regardless of the order, each cable is fed through corresponding slots of the ears so that the cables are arranged helically around the shaft. The restraining feature 1600 can be used to hold the size opposite to the one being threaded through. Multiple cables can be held at the same time. The restraining feature 1602 is used to hold a first end of one cable in place, while the restraining feature 1700 is used to hold a first end of another cable in place, in particular for cables that have already been fed through. 1600, 1602, 1700 allow the apparatus to maintain the correct tension on the cable(s) to free the operator's hand while the fingers are installed. FIG. 18 illustrates the assembly once the connectorized cables have been wound through the ear receptacles.

Once the cables have been helically wound around the shaft, the finger structures are fastened or otherwise secured to the shaft. After the finger structures are secured, the threaded fastener members 1504a and 1504b are disengaged from the restraining features and the ears are removed from the shaft. The first ends of the cable connectors may be secured to the shaft via brackets, such as brackets 1010 and 1012 discussed above, for instance by riveting the brackets to the shaft. Once the brackets are installed, the connectors can be plugged into the brackets. The result is a completed arrangement such as shown in FIG. 10A. The portions of the two cables that are outside of the helical arrangement, e.g., between the base of the finger structure and the brackets, can be affixed to each other using zip ties, shrink wrap tubing or other connection means. The other ends of the cable connectors on the opposite side of the helical arrangement can be plugged into receptacles of the lateral propulsion assembly. This approach enables rapid assembly time using connectorized cables, significantly reducing assembly time from manual approaches that require attaching the connectors after winding the cabling in the desired arrangement.

The helical cabling arrangement can be used in a variety of rotational electromechanical applications such as robots, automotive systems, aerospace technologies, etc.

The foregoing examples are not mutually exclusive and may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A tool for configuring a rotatable cable management system, the tool comprising:
    a first helix ear member configured for removable attachment to a first area of an exterior surface of a coupling member, the first helix ear member having a plurality of slots disposed therealong, at least a portion of each slot being enlarged to receive a connectorized cable;
    a second helix ear member configured for removable attachment to a second area of the exterior surface of the coupling member, the second helix ear member having a plurality of slots disposed therealong, at least a portion of each slot being enlarged to receive the connectorized cable;
    a first set of fastener or retaining members received by the first helix ear member, the first set of fastener or retaining members being configured to removably attach the first helix ear member to the first area of the coupling member; and
    a second set of fastener or retaining members received by the second helix ear member, the second set of fastener or retaining members being configured to removably attach the second helix ear member to the second area of the coupling member;
    wherein, upon affixation to the coupling member, the second helix ear member is arranged along the second area opposite to the first helix ear member arranged along the first area, and wherein the enlarged portions of the slots of the first and second helix ear members are configured to receive a connector end of the connectorized cable so that the connectorized cable can be wound in a helical arrangement around the exterior surface of the coupling member.

2. The tool of claim 1, wherein, when the first and second helix ear members are attached to the exterior surface of the coupling member:
the enlarged portions of the slots of the first helix ear member are remote from the exterior surface, and
the enlarged portions of the slots of the second helix ear member are remote from the exterior surface.

3. The tool of claim 1, wherein:
at least some of the plurality of slots of the first helix ear member have different lengths; and
at least some of the plurality of slots of the second helix ear member have different lengths.

4. The tool of claim 3, wherein the plurality of slots of the first helix ear member includes at least 3 slots including a central slot and two other slots adjacent to the central slot, and the plurality of slots of the second helix ear member includes at least 3 slots including a central slot and two other slots adjacent to the central slot.

5. The tool of claim 4, wherein:
the central slot of the first helix ear member is longer than the two other slots of the first helix ear member; and
the central slot of the second helix ear member is longer than the two other slots of the second helix ear member.

6. The tool of claim 4, wherein:
the enlarged portions of the two other slots of the first helix ear member extend away from one another; and
the enlarged portions of the two other slots of the second helix ear member extend away from one another.

7. The tool of claim 1, wherein the first helix ear member includes at least one temporary restraining feature configured to temporarily secure the connectorized cable during or after winding in the helical arrangement.

8. The tool of claim 1, wherein the second helix ear member includes a temporary restraining feature configured to temporarily secure the connectorized cable during or after winding in the helical arrangement.

9. The tool of claim 1, wherein:
the first helix ear member includes at least one temporary restraining feature configured to temporarily secure the connectorized cable during or after winding in the helical arrangement; and
the second helix ear member includes a temporary restraining feature configured to temporarily secure the connectorized cable during or after winding in the helical arrangement.

10. The tool of claim 9, wherein the at least one temporary restraining feature includes a first temporary restraining feature disposed along a first side of the first helix ear member and a second temporary restraining feature disposed along a second side of the first helix ear member, the second side being opposite the first side.

11. A method of configuring a rotatable cable management system using a removable tool, the method comprising:
removably securing a first helix ear member to a first area of an exterior surface of a coupling member, the first helix ear member having a plurality of slots disposed therealong, at least a portion of each slot being enlarged to receive a connectorized cable;
removably securing a second helix ear member to a second area of the exterior surface of the coupling member, the second helix ear member having a plurality of slots disposed therealong, at least a portion of each slot being enlarged to receive the connectorized cable, wherein, upon affixation to the coupling member, the second helix ear member is arranged along the second area opposite to the first helix ear member arranged along the first area;
inserting a connectorized end of the connectorized cable into the enlarged portion of a first slot of the plurality of slots of the first helix ear member; and
sequentially passing the connectorized end of the connectorized cable through the enlarged portions of the plurality of slots of the first and second helix ear members to wind the connectorized cable in a helical arrangement around the exterior surface of the coupling member.

12. The method of claim 11, further comprising:
fixedly securing a cable management structure to the coupling member, the cable management structure maintaining the cable in the helical arrangement; and
upon fixedly securing the cable management structure to the coupling member, removing the first helix ear member from the first area of the of the exterior surface of the coupling member, and removing the second helix ear member from the second area of the of the exterior surface of the coupling member.

13. The method of claim 12, wherein the cable management structure comprises a plurality of finger structures, and fixedly securing the cable management structure to the coupling member includes securing each of the plurality of finger structures in a disturbed arrangement around the exterior surface of the coupling member.

14. The method of claim 11, further comprising:
prior to removably securing the first helix ear member to the coupling member, arranging the first helix ear member adjacent to the first area of the exterior surface of the coupling member in accordance with a marker of the coupling member; and
prior to removably securing the second helix ear member to the coupling member, arranging the second helix ear member adjacent to the second area of the exterior surface of the coupling member in accordance with the marker.

15. The method of claim 11, further comprising:
after sequentially passing the connectorized end of the connectorized cable through the enlarged portions of one or more of the plurality of slots of the first and second helix ear members, disposing the connectorized end in a first temporary restraining feature of either the first helix ear member or the second helix ear member.

16. The method of claim 15, further comprising:
after sequentially passing the connectorized end of the connectorized cable through the enlarged portions of one or more of the plurality of slots of the first and second helix ear members, disposing an opposing end of the connectorized cable in a second temporary restraining feature of either the first helix ear member or the second helix ear member.

17. The method of claim 11, further comprising:
inserting a connectorized end of a another connectorized cable into the enlarged portion of the first slot of the plurality of slots of the first helix ear member; and
sequentially passing the connectorized end of the other connectorized cable through the enlarged portions of the plurality of slots of the first and second helix ear members to wind the other connectorized cable in a helical arrangement around the exterior surface of the coupling member, so that both the connectorized cable and the other connectorized cable are each wound in the helical arrangement.

18. The method of claim 11, further comprising:

securing a bracket member to a third area of the exterior surface of a coupling member; and affixing the connectorized end of the connectorized cable to the bracket member.

19. The method of claim 11, further comprising attaching the connectorized cable to a lateral propulsion system of a high altitude platform configured for operation in the stratosphere.

20. The method of claim 19, further comprising attaching the coupling member to a connection member of the high altitude platform.

* * * * *